United States Patent [19]

Geibel et al.

[11] Patent Number: 5,474,585
[45] Date of Patent: Dec. 12, 1995

[54] FILTERING APPARATUS

[75] Inventors: Stephen Geibel, Cortland, N.Y.; Ulrich Otto, Mühlheim, Germany; Glen Petaja, Cortland; Eric Simonson, Homer, both of N.Y.

[73] Assignee: Pall Corporation, East Hills, N.Y.

[21] Appl. No.: 245,501

[22] Filed: May 18, 1994

[51] Int. Cl.⁶ ............................................. B01D 46/04
[52] U.S. Cl. .......................... 55/302; 55/286; 55/341.1; 55/523; 210/323.2; 210/333.01
[58] Field of Search .......................... 55/284, 286, 287, 55/302, 303, 341.1–341.7, 378, 523; 210/323.2, 333.01

[56] References Cited

U.S. PATENT DOCUMENTS

| Re. 24,954 | 3/1961 | Church | 55/302 X |
|---|---|---|---|
| 2,792,074 | 5/1957 | Schilb et al. | 55/341.1 X |
| 3,128,160 | 4/1964 | Bascom | 55/341.1 X |
| 3,368,331 | 2/1968 | Baxendale | 55/341.7 X |
| 3,376,696 | 4/1968 | Wells et al. | 55/341.7 X |
| 3,421,295 | 1/1969 | Swift et al. | 55/341.7 X |
| 3,436,898 | 4/1969 | Kaess et al. | 55/341.1 X |
| 3,480,330 | 11/1969 | Hirs et al. | 55/302 X |
| 3,535,852 | 10/1970 | Hirs | 55/302 |
| 3,616,614 | 11/1971 | Eisenegger | 55/302 X |
| 3,729,903 | 5/1973 | Espeel et al. | 55/302 X |
| 3,841,065 | 10/1974 | Espeel | 55/302 X |
| 4,180,459 | 12/1979 | Zievers | 210/10 |
| 4,238,329 | 12/1980 | Zievers | 210/36 |
| 4,289,630 | 9/1981 | Schmidt, Jr. et al. | 210/785 |
| 4,298,360 | 11/1981 | Poll | 55/302 X |
| 4,343,632 | 8/1982 | Margraf | 55/341.7 |
| 4,395,269 | 7/1983 | Schuler | 55/302 |
| 4,415,343 | 11/1983 | Margraf | 55/341.7 X |
| 4,452,707 | 6/1984 | Zievers et al. | 210/777 |
| 4,525,184 | 6/1985 | Tassicker | 55/302 |
| 4,526,688 | 7/1985 | Schmidt, Jr. et al. | 210/323.2 |
| 4,539,025 | 9/1985 | Ciliberti et al. | 55/302 |
| 4,664,752 | 5/1987 | Zievers et al. | 203/10 |
| 4,713,174 | 12/1987 | Zievers et al. | 210/233 |
| 4,725,356 | 2/1988 | Zievers et al. | 210/323.2 |
| 4,741,841 | 5/1988 | Borre et al. | 210/785 |
| 4,764,190 | 8/1988 | Israelson et al. | 55/302 X |
| 4,765,809 | 8/1988 | Reichel et al. | 55/267 |
| 4,820,320 | 4/1989 | Cox | 55/302 |
| 4,865,629 | 9/1989 | Zievers et al. | 55/97 |
| 4,909,813 | 3/1990 | Eggerstedt | 55/302 |
| 4,928,624 | 5/1990 | Overton, Jr. | 55/302 X |
| 4,953,308 | 9/1990 | Basten et al. | 55/302 X |
| 4,960,448 | 10/1990 | Zievers | 55/523 |
| 4,968,467 | 11/1990 | Zievers | 264/62 |
| 4,969,937 | 11/1990 | Tassicker | 55/302 |
| 5,037,461 | 8/1991 | Zievers et al. | 55/482 |
| 5,059,227 | 10/1991 | Kilicaslan et al. | 55/490 |
| 5,071,457 | 12/1991 | Schmidt, Jr. et al. | 55/523 |
| 5,078,760 | 1/1992 | Haldipur et al. | 55/302 X |
| 5,125,277 | 6/1992 | Zievers | 73/863.23 |
| 5,143,530 | 9/1992 | Haldipur et al. | 55/341 |
| 5,152,815 | 10/1992 | Zievers et al. | 55/341.1 |
| 5,185,018 | 2/1993 | Zievers et al. | 55/341.1 |
| 5,185,019 | 2/1993 | Haldipur et al. | 55/378 |
| 5,209,844 | 5/1993 | Zievers et al. | 210/232 |
| 5,223,138 | 6/1993 | Zievers et al. | 210/497.01 |
| 5,238,478 | 8/1993 | Zievers et al. | 55/523 |
| 5,256,175 | 10/1993 | Zievers et al. | 55/302 |
| 5,298,159 | 3/1994 | Peterman | 210/323.2 X |

FOREIGN PATENT DOCUMENTS 0129053  12/1984  European Pat. Off. .
WO91/00769  1/1991  WIPO .

OTHER PUBLICATIONS

Eggerstedt et al., "Choose the Right Ceramic for Filtering Hot Gases", Chem. Eng. Prog., Jan. 1993, pp. 62–68.

*Primary Examiner*—Robert Spitzer
*Attorney, Agent, or Firm*—Leydig, Voit & Mayer

[57] ABSTRACT

A filtering apparatus includes a filter vessel having an inlet and an outlet for fluid. A tube sheet is disposed within the filter vessel and separates the inlet from the outlet. A plurality of elongated filter elements extend nonvertically from the tube sheet, each filter element having a first end and a second end farther from the tube sheet than the first end and being at a different height than the first end.

68 Claims, 14 Drawing Sheets

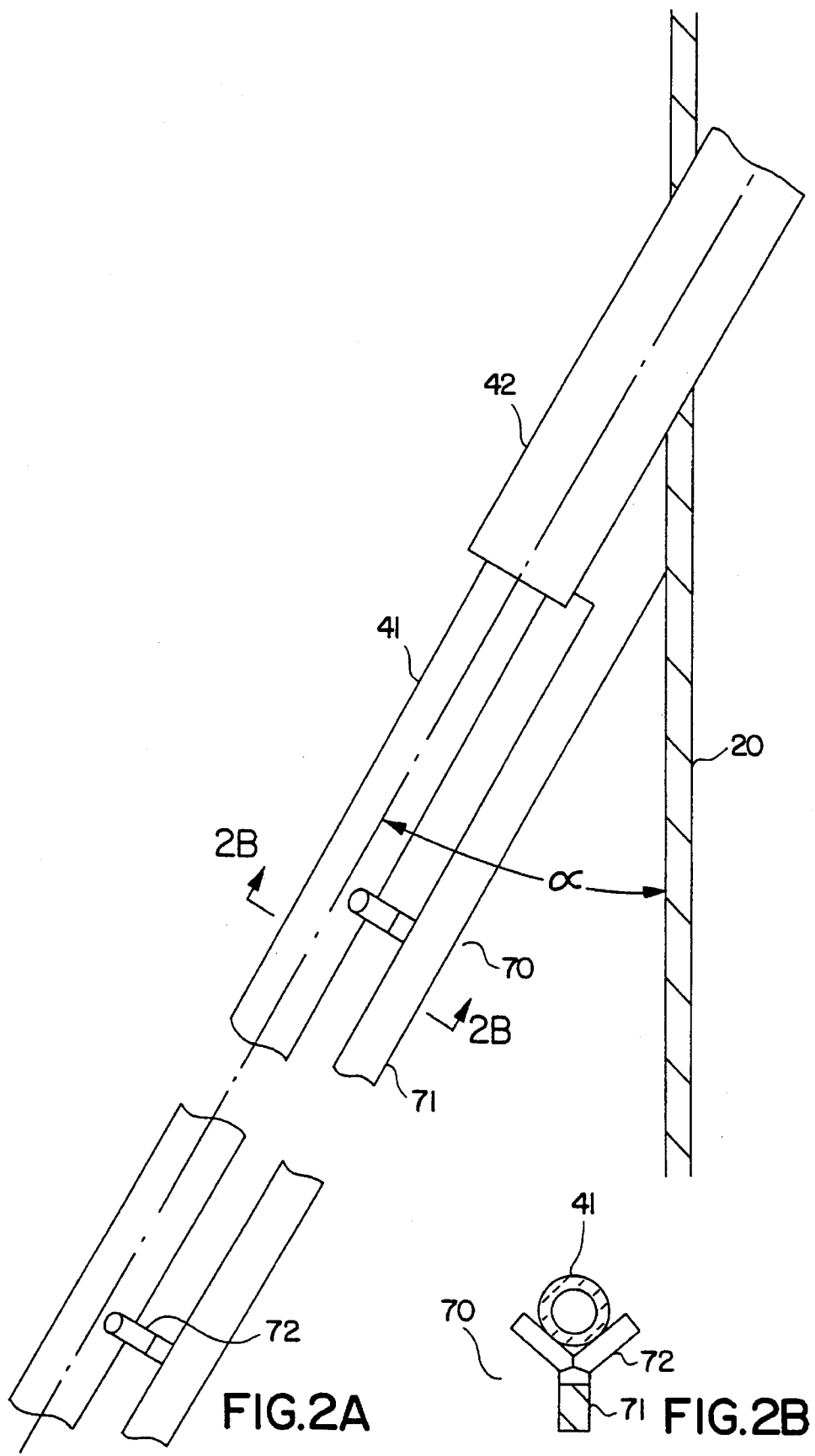

FILTERING APPARATUS

BACKGROUND OF THE INVENTION

1. Industrial Field of Use

The invention relates to a filtering apparatus for fluids, including gases and liquids. More particularly but not exclusively, it relates to a filtering apparatus for hot gases.

2. Description of the Related Art

In many applications, a filtering apparatus for fluids comprises a plurality of filter elements arranged in a vessel. A fluid is fed into the vessel and is filtered through the filter elements before leaving the vessel through an outlet. An example of such a filtering apparatus is a hot gas filtering apparatus.

Hot gas filtering apparatuses are used to separate particulates from a hot gas flow which may have a temperature between 300° and 1000° C. and a pressure of up to 20 bars. Such hot gases are found, for example, in power generation systems where the gas drives a turbine. The gas may be derived from a process such as a pressurized fluidized bed. Hot gases of this kind are also found in gasification combined cycles and fluidized catalytic cracking.

In a process of this kind, the hot gases generated are laden with particles such as dust and ash. For this reason, after generation, the hot gases are generally passed first through a cyclone, which removes the majority of these particles. However, such cyclones do not remove fine particles such as fly ash and it is essential that such particles be removed since gas turbines, for example, are very sensitive to the presence of such particles. In addition, since the gas is exhausted to the atmosphere after passing through the turbine, it is desirable not to discharge such particles into the atmosphere. Hot gas filtering apparatuses are used to remove these particles.

A hot gas filtering apparatus may contain a number of filter elements which, because of the temperatures encountered (in the range of 800° C.) are usually made of ceramic materials such as silicon carbide. However, such filter elements, commonly referred to as candles, have a low flow per unit pressure drop and this, combined with the requirement to remove all particles for significant periods of time and combined with high gas flow rates, requires a large number of filter elements. For example, a hot gas filtering apparatus may contain thousands of such elements.

One form of hot gas filtering apparatus has a filter vessel containing a plurality of filter elements with an inlet feeding particulate-laden hot gas to the outer surface of the filter elements and an outlet removing filtered hot gas from the interiors of the filter elements. The filter elements may be vertically suspended from a manifold.

Hot gas ceramic filter elements have a limited lifetime in the range of 6–18 months. Due to severe service conditions, they can be susceptible to damage. For example, ceramic candles are susceptible to thermal shock cracking, since ceramics are inherently brittle. For this reason, it is desirable to be able to remove and replace individual filter elements. However, in a conventional filtering apparatus, doing so can require the dismantling of significant portions of the filter vessel and is therefore time-consuming. Furthermore, service personnel who replace the filter elements frequently must enter into the region of the vessel surrounding the filter elements and may be exposed to harmful substances present in the vessel.

A filtering apparatus for use with a commercial-size pressurized fluidized bed combustion system may have as many as 10,000 filter elements. If the filter elements are arranged in a conventional manner within a vessel, the vessel and a tube sheet for supporting the filter elements must be quite large and correspondingly expensive to manufacture, especially if they are made from high temperature alloys. For example, a conventional flat tube sheet able to support 2000 ceramic candles may need a diameter of more than 5 meters. The large size of the tube sheet results in increased mechanical loading on the tube sheet from both the weight of the filter elements and the pressure differential across the tube sheet. This results in thicker and more expensive tube sheets as the number of filter elements increases. The increased expense becomes particularly marked as the operating temperature of the filtering apparatus increases, because the high operating temperatures and corrosive atmospheres in many applications require the use of high cost materials. Even these materials have significantly reduced strength and elevated temperatures, resulting in even thicker tube sheets being required.

Accordingly, there is a need for a filtering apparatus which can support a large number of filter elements with a lightweight, economical structure. There is also a need for a filtering apparatus which can compactly support a large number of filter elements while still permitting the filter elements to be easily replaced.

After filtering for a period of time, the filter elements of some fluid filtering apparatuses are customarily cleaned by supplying them with fluid which is directed into the interior of each filter element and emerges from the exterior surface to remove from the exterior surface particulate matter clinging to the surface. This cleaning method is commonly referred to as backwashing (when the fluid is a liquid) or blowback (when the fluid is a gas). The term "reverse flow cleaning" will be used to cover both situations. In filtering apparatuses in which blowback is performed, it is customary to blow gas through each filter element individually, and significant amounts of piping are required to conduct fluid to each filter element. When the filtering apparatus includes thousands of filter elements, the cost of the piping can be extremely high.

SUMMARY OF THE INVENTION

It is an object of the present invention to provide a filtering apparatus having filter elements which can be easily installed and replaced with minimized health risk to service personnel who do the installation and replacement.

It is another object of the present invention to provide a filtering apparatus having filter elements compactly arranged.

It is a further object of the present invention to provide a filtering apparatus having a simple structure for cleaning filter elements with a fluid by reverse flow cleaning.

It is yet another object of the present invention to provide a strong yet light tube sheet capable of supporting a plurality of filter elements.

According to one aspect of the present invention, a filtering apparatus includes a filter vessel having an inlet and an outlet for fluid and a tube sheet disposed within the filter vessel. A plurality of filter elements are supported by the tube sheet extending diagonally from the tube sheet. In a preferred embodiment, each filter element extends diagonally downwards from the tube sheet.

Inclining the filter elements with respect to the vertical enables a large number of the filter elements to be housed within a small volume while enabling particulate matter to slide down the filter elements during reverse flow cleaning.

Preferably, the dimensions of the tube sheet are such that the filter elements can be withdrawn in their lengthwise direction entirely into the chamber defined by the tube sheet.

According to another aspect of the present invention, a filtering apparatus includes a filter vessel having an inlet and an outlet for fluid. A tube sheet is disposed within the filter vessel and separates the inlet from the outlet. The tube sheet has a double-walled structure with first and second opposing walls separated by a space, and a plurality of filter elements are supported by the tube sheet, preferably in a manner permitting the filter elements to be installed on and detached from the tube sheet without disassembling the tube sheet.

The double-walled structure makes the tube sheet strong yet light and easier to form holes in than a solid tube sheet. The space between the walls of the tube sheet may be connected to the exterior of the vessel by a passage for a reverse flow cleaning fluid for the filter elements. By introducing a reverse flow cleaning fluid between the walls of the tube sheet, there can be significant savings in the volume of pipework required for the cleaning fluid. In addition, in a hot gas filtering apparatus, the cleaning fluid, which is a gas, will be pre-heated by passage between the walls and thereby reduce the possibility of thermal shock to the filter elements. Furthermore, the comparatively large volume between the walls minimizes the pressure drop on the gas.

The tube sheet may have various shapes, such as planar or tubular. According to one aspect of the invention, the tube sheet defines a chamber having a periphery bounded by the tube sheet, and the interior of the chamber sheet is accessible from outside the vessel for removal of the filter elements from the tube sheet.

By mounting the filter elements on a tube sheet defining a chamber which is accessible from the exterior of the vessel, individual filter elements can readily be removed from the interior of the tube sheet without service personnel having to enter into contaminated portions of the vessel. The health risks to service personnel are therefore greatly reduced.

In a preferred embodiment, the vessel is elongated with the length thereof arranged vertically. An upper end of the vessel is provided with a closable service opening through which service personnel can access the inside of the chamber defined by the tube sheet.

The vessel may contain a plurality of such tube sheets, each carrying a plurality of filter elements and each communicating with the exterior of the vessel. By having a plurality of tube sheets each defining a separate chamber, the filter elements on different tube sheets can be cleaned separately from one another. To more effectively utilize the vessel space, the filter elements can be of varying length.

It will be appreciated that the various aspects of the invention described above can be utilized together in any combination.

BRIEF DESCRIPTION OF THE DRAWINGS

FIG. 2A is an enlarged view of one of the filter assemblies of FIG. 1, FIG. 2B is a cross-sectional view taken along line B—B of FIG. 2A.

DESCRIPTION OF PREFERRED EMBODIMENTS

Figure 1:
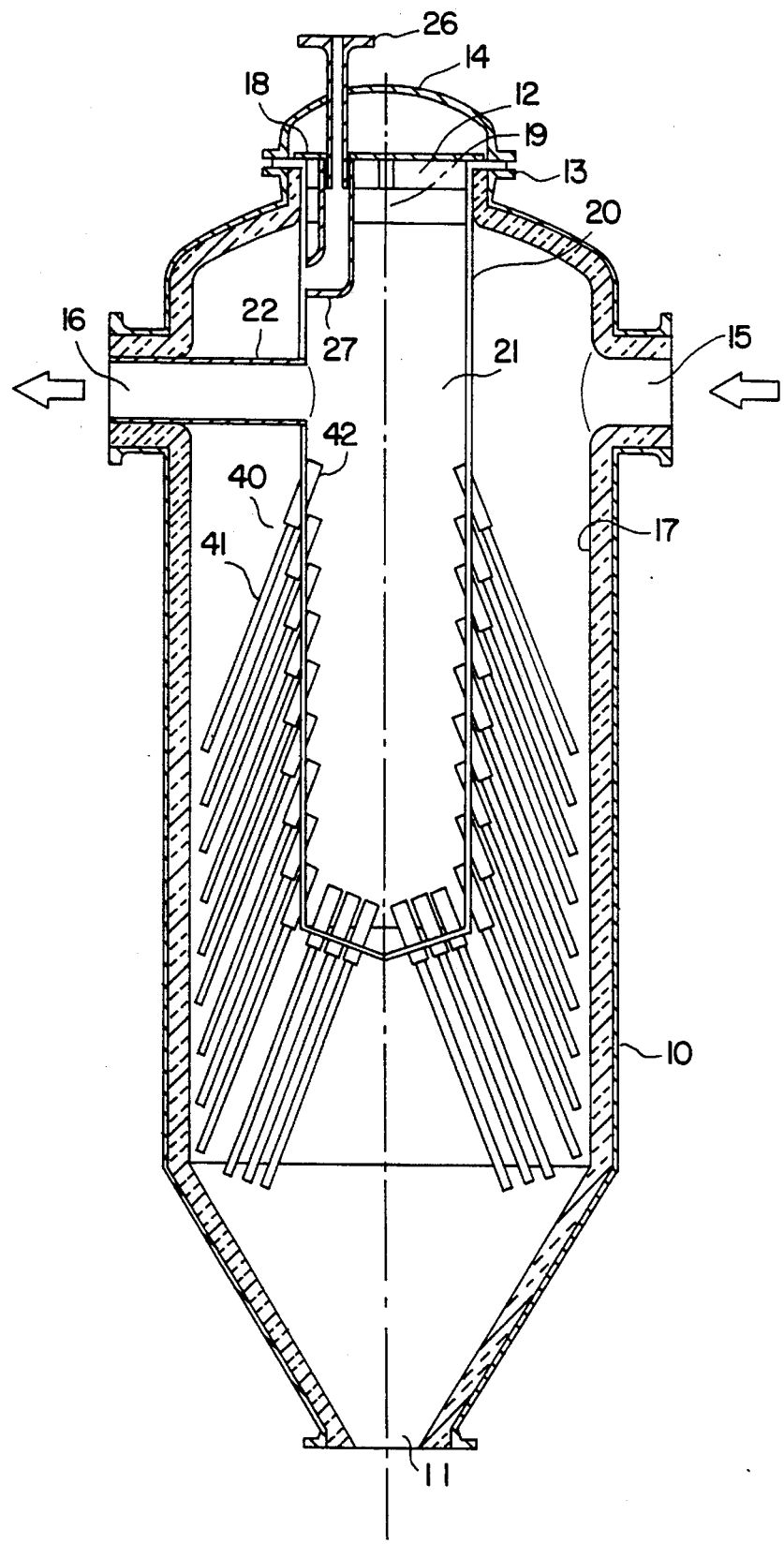
FIG. 1 is a vertical cross-section of an embodiment of a hot gas filter arrangement according to the present invention.

FIGS. 1 to 3 illustrate a first embodiment of a filtering apparatus according to the present invention. The illustrated embodiment may be used in filtering hot gas, but the present invention is not restricted to use with any particular fluid, and can be used to filter both liquids and gases.

The illustrated embodiment includes an outer vessel 10 of generally cylindrical shape with the axis of the vessel 10 arranged vertically, although the vessel 10 may have any suitable shape and orientation. A particulate outlet 11 is provided at a lower end of the vessel 10. The upper portion of the vessel 10 is provided with a service opening 12 surrounded by an annular flange 13. A lid 14 is detachably secured to the flange 13 by bolts or other suitable means to enable the service opening 12 to be opened and closed. A side wall having a cylindrical upper portion and a conical lower portion extends between the particulate outlet 11 and the service opening 13. A hot gas inlet 15 for gas to be filtered and an outlet 16 for filtered gas are provided in the cylindrical portion of the vessel 10. The interior surfaces of the vessel 10 are lined with a heat-insulating material 17 such as a ceramic material. Such materials are well known in the art.

The vessel 10 is illustrated as being formed as a unitary structure between the particulate outlet 11 and the service opening 12, but it may be formed of a plurality of sections joined together in a fluid-tight manner by suitable means, such as body flanges bolted or welded together.

Figure 3A:
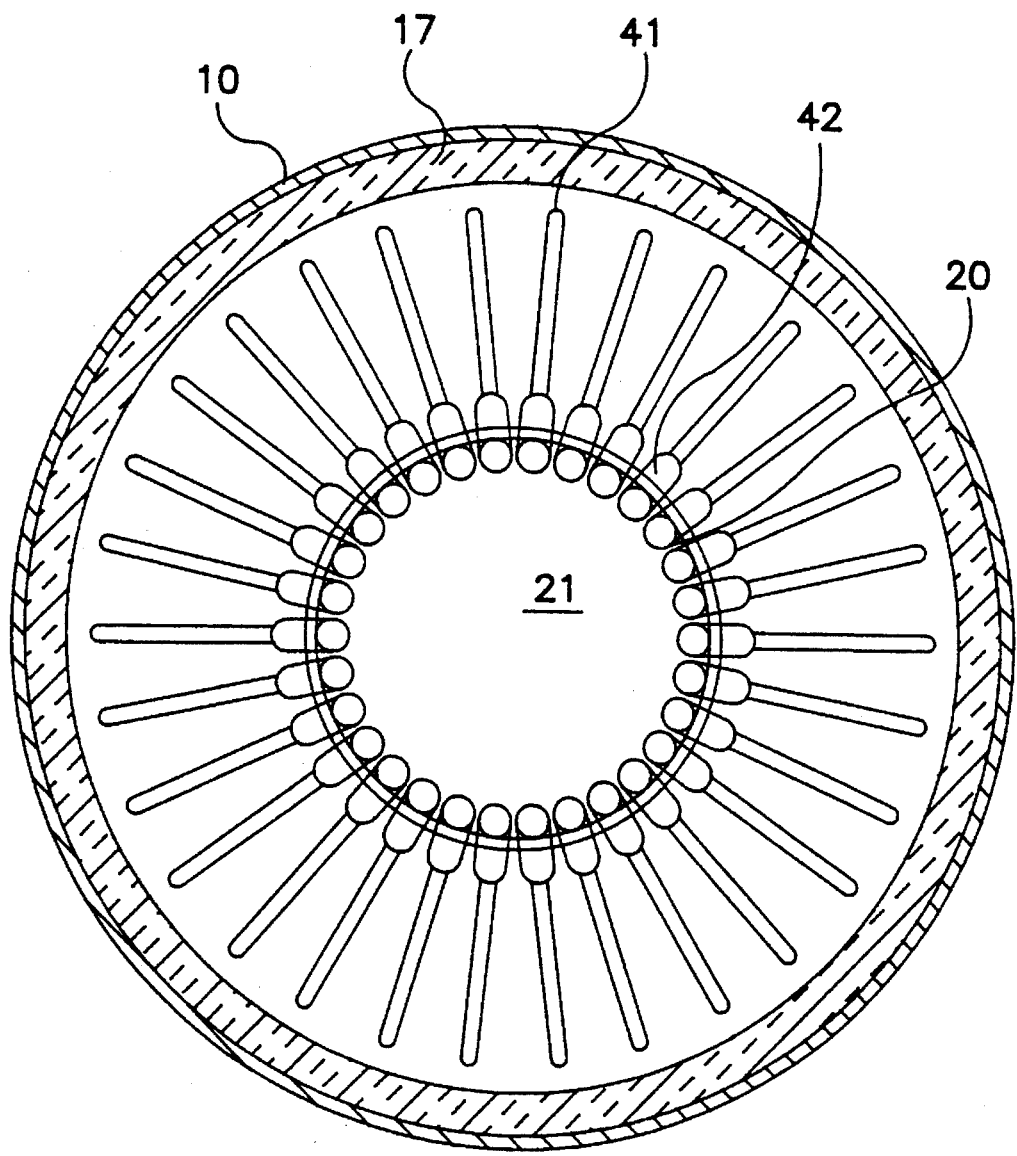
FIG. 3A is a transverse cross-sectional view of the embodiment of FIG. 1.

A plurality of filter assemblies 40 are supported inside the vessel 10 by an upright tube sheet 20 which separates the inlet 15 from the outlet 16 of the vessel 10. The filter assemblies 40 can be mounted on the tube sheet 20 in any suitable manner. The number of filter assemblies 40 will depend upon the size of the filtering apparatus and may be several thousand or more. The tube sheet 20 defines a chamber 21 surrounded by the side and end walls of the tube sheet 20 and having an exterior communicating with the inlet 15 and an interior communicating with the outlet 16. The shape of the tube sheet 20 is not critical. In the present embodiment, as shown in FIG. 3A, it is a vertical cylinder with an outer diameter generally equal to the diameter of the service opening 12. It is suspended from the flange 13 and extends into the interior of the vessel 10 coaxial with the central axis of the vessel 10. Additional supports (not shown) may be arranged between the tube sheet 20 and the vessel 10 to secure the tube sheet 20 in place within the vessel 10. The tube sheet 20 is open at its upper end and is provided with an end wall closing its lower end. The end wall can be of various shapes, such as flat, conical, or arcuate. The walls of the tube sheet 20 can be of any structure which enables them to support the filter assemblies 40. For example, the walls of the tube sheet 20 may be solid, or as described below, they may be hollow with a double-walled construction.

A plate 18 rests on the open end of the tube sheet 20 and carries a heat shield 19 which hangs from the plate 18 and which plugs the upper end of the tube sheet 20 to reduce the passage of heat from the interior of the tube sheet 20 to the lid 14 and the flange 13, which might be damaged by such heat. An example of a suitable heat shield 19 is one formed by a plurality of layers of sheet metal.

The tube sheet 20 has an outlet 22 for filtered fluid which extends from the side wall of the tube sheet 20 and connects the interior of the tube sheet 20 with the vessel outlet 16.

Each filter assembly 40 includes an elongated filter element 41 projecting outwardly from the tube sheet 20 into the vessel 10 and a mount 42 connecting the filter element 41 to the tube sheet 20. As viewed from above, the filter elements 41 may extend either radially (as shown in FIG. 3A) or nonradially with respect to the axis of the tube sheet 20. In addition, the filter elements 41 may be inclined at any angle with respect to the vertical, including horizontal. However, in order to assist debris in falling off the filter elements 41 during reverse flow cleaning, preferably the filter elements 41 either slope upwards or downwards from their inner ends (the ends attached to the tube sheet 20) towards their outer ends. More preferably, the outer end of each filter element 41 is preferably lower than its inner end so that debris will slide off the outer end of the filter element 41 during reverse flow cleaning rather than accumulating along the outer surface of the tube sheet 20. Preferably, the outer end of each filter element 41 is spaced from the inner wall of the vessel 10.

As shown in FIG. 2A, which is an enlarged view of one of the filter assemblies 40 of FIG. 1, each filter element 41 has a centerline which is inclined away from the vertical by an angle α. Preferably, this angle α is between 10° and 60° and more preferably between 20° and 45°. Many of the filter elements 41 extend through the space between the vertical side wall of the vessel 10 and the vertical side wall of the tube sheet 20. The angle α may be selected to allow efficient packing of the filter elements 41 in this space and/or to reduce the outside diameter of the vessel 10.

The filter element 41 is not restricted to any particular type and can be selected in accordance with the fluid which is to be filtered. In a filtering apparatus for hot gas, an example of a suitable filter element 41 is a commercially available ceramic filter element made from silicon carbide. Another preferred filter element for use with hot gas is formed of a porous metal medium such as sintered porous stainless steel. Such a filter element is available from Pall Corporation of East Hills, New York under the trade name PSS. Examples of other suitable high temperature filter elements include glass fiber filters while natural fiber filters and polymeric fiber or membrane filters may be used for lower temperature environments. The filter element 41 can be a reusable filter element which can be cleaned by reverse flow (backwashing or blowback) while installed on the tube sheet 20, or it may be a disposable element which is simply replaced when it becomes loaded with contaminants. In some embodiments, a precoat layer may be deposited on each filter element and then removed once it is spent or fouled.

The filter elements 41 of FIG. 1 are elongated, hollow tubes having an outer end which is closed and an inner end communicating with the inside of the tube sheet 20. However, filter elements without a hollow center are equally applicable to the present invention.

When the filter element 41 is long, it may have insufficient strength to support its own weight when extending diagonally from the tube sheet 20 as a cantilever. Accordingly, as shown in FIGS. 2A and 2B, the filtering apparatus may include a support member for supporting the filter element 41. In this embodiment, such a support member 70 includes a rigid bar 71 secured to the tube sheet 20 and extending parallel to and below the filter element 41. Y-shaped crotches 72 formed from metal rods are secured to the bar 71 at intervals. The filter element 41 loosely rests atop the crotches 72, which support the weight of the filter element 41.

Figure 2C:
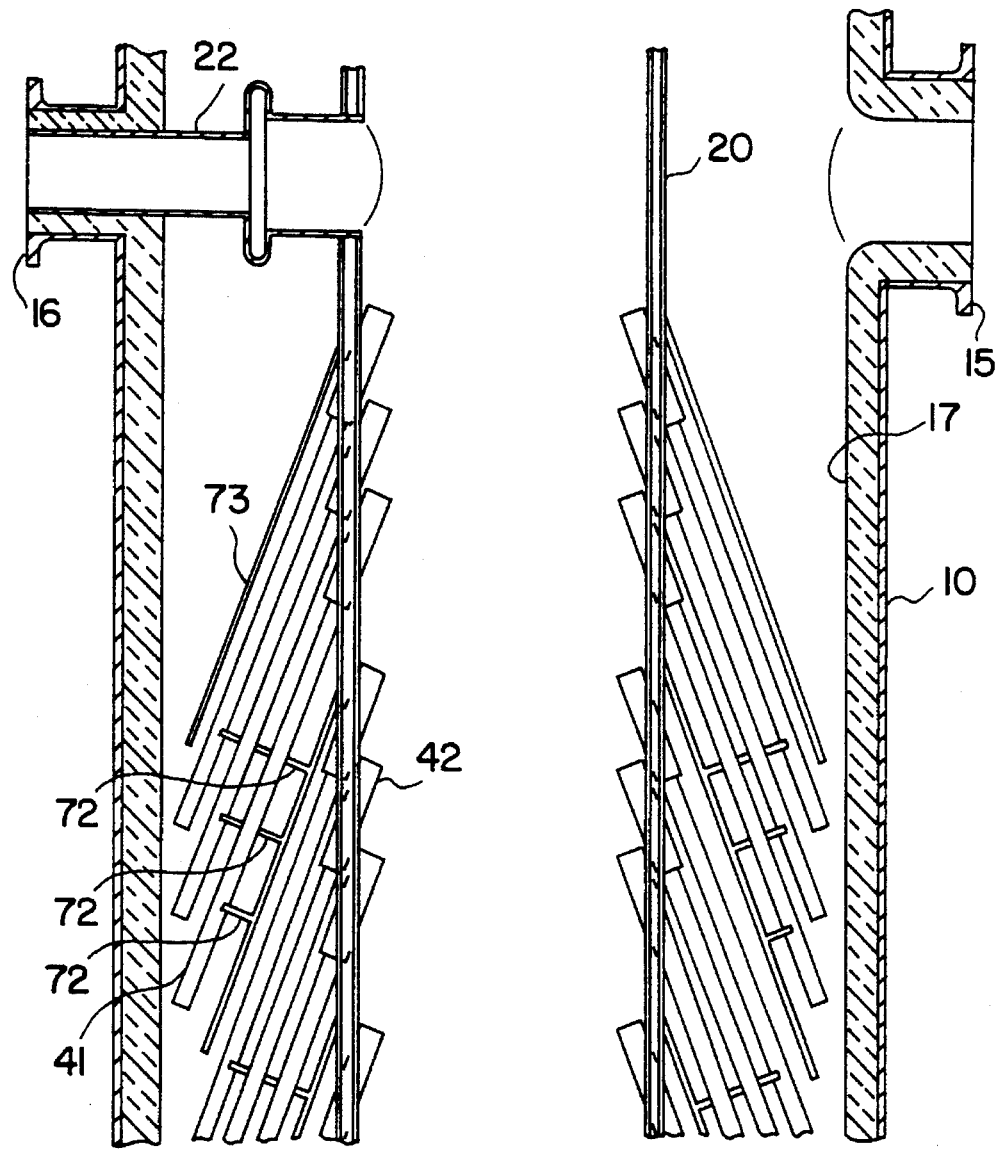
FIG. 2C is a cross-sectional view of another embodiment.

FIG. 2C is a cross-sectional view of another embodiment of the present invention employing a different structure for supporting the filter elements 41. Guard plates 73 made of a high-temperature material are mounted on the outside of the tube sheet 20 between tiers of filter elements 41 at prescribed intervals, such as beneath every third tier. The guard plates 73 act as chutes for particulate matter dislodged from the filter elements 41 during reverse flow cleaning and prevents the particulate matter from falling onto filter elements 41 disposed beneath the guard plates 73. Particulate matter which falls onto the guard plates 73 from the filter elements 41 during cleaning slides down the upper surfaces of the plates 73 to their outer edges and then falls to the bottom of the vessel 10 without contacting the filter elements 41 beneath the guard plates 73. The guard plates 73 can be equipped with Y-shaped crotches 72 or similar members for supporting the filter elements 41, thereby serving the same function as the support members 70 of FIG. 2A. A guard plate 73 can also be disposed above the uppermost tier of filter elements 41 to make the flow of gas from the inlet 15 more uniform and to protect the filter elements 41 from too high a flow rate. The shape of the guard plates 73 is not critical, but preferably they are shaped so as to permit vertical flow of fluid past the filter elements 41 along the outside of the tube sheet 20. For example, if the guard plates 73 are conical and extend around the entire periphery of the tube sheet 20, they may be formed with perforations through which fluid can flow. Alternatively, each guard plate 73 can be formed of a plurality of sections separated by gaps for fluid flow.

The inner diameter of the tube sheet 20 is preferably sufficiently large that a service worker can enter into the chamber 21 defined by the tube sheet 20 in order to install and replace the filter elements 41 from within the chamber 21. The inner diameter and the angle α are preferably arranged such that each filter element 41 can be withdrawn entirely into the chamber 21 in the lengthwise direction of the filter element 41. Accordingly, the inner diameter of the tube sheet 20 will depend upon the lengths of the filter elements 41 and the angle α at which they are supported.

The filtering apparatus described above with reference to the drawings has a number of advantages:

1. A tubular tube sheet, such as tube sheet 20 of FIG. 1, allows easy access to the interior of the tube sheet via the service opening 12 in the vessel 10. Thus, maintenance of any of the filter assemblies 40 can be easily and quickly achieved with a decrease in down time. In contrast, in a conventional filtering apparatus containing a large number of filter elements it is frequently necessary to disassemble significant portions, the filter vessel in order to replace any of the filter elements.

2. The presence of the heat shield 19 protects the lid 14 and the flange 13 of the vessel 10 from the effects of the heat within the tube sheet 20.

3. The fact that the tube sheet 20 depends from the top of the vessel 10 means that the filtering apparatus can be scale size by simply increasing or decreasing the axial lengths of the vessel 10 and the tube sheet 20 with the addition or removal of an appropriate number of filter assemblies.

4. The inclining of the filter elements 41 away from the vertical relative to the tube sheet axis has a number of advantages. It allows the filter elements 41 to be mounted on vertically extending surfaces and so allows a large number of filter elements 41 to be packed into a given volume, and 2000 or more filter elements 41 can easily be housed within a single filter vessel 10. In addition, the angling of the filter elements 41 allows cake released by reverse flow cleaning to fall readily clear of the filter elements 41 to the particulate outlet 11 of the vessel 10. The angling also allows easy replacement of the filter elements 41 from the interior of the tube sheet 20, since each filter element 41 can be withdrawn in a direction along its centerline into the interior of the tube sheet 20 even though the diameter of the tube sheet 20 is less than the length of each filter element 41.

5. The heat insulation 17 for the vessel 10 is located outside of the tube sheet 20 and so cannot be a source of contamination for the filtered fluid inside the tube sheet 20.

6. Service personnel do not need to enter contaminated regions of the vessel 10 in order to replace the filter elements 41, so health risks to service personnel are reduced. In addition, since replacement of the filter elements 41 can be performed from inside the tube sheet, there is much less possibility of damage due to inadvertent contact by a service worker with filter elements 41 adjoining a filter element 41 which is being replaced.

7. A tubular tube sheet 20 can be lighter and more economical to manufacture than a conventional flat tube sheet supporting the same number of filter elements.

Figure 3B:
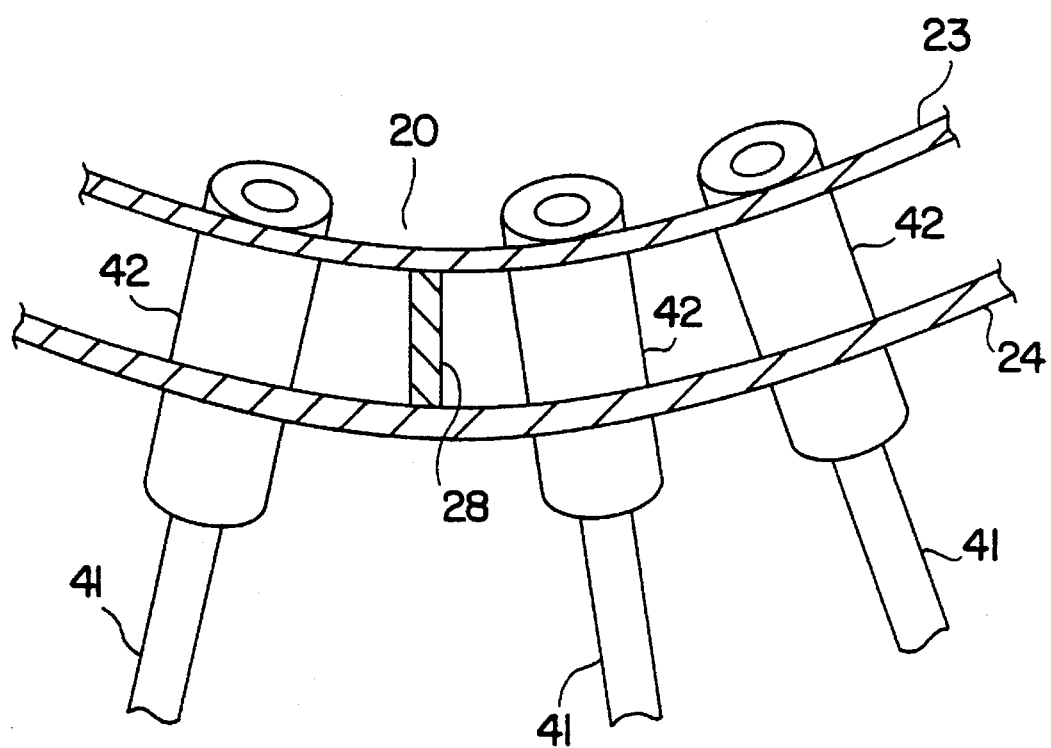
FIG. 3B is an enlarged view of a portion of FIG. 3A.
Figure 4A:
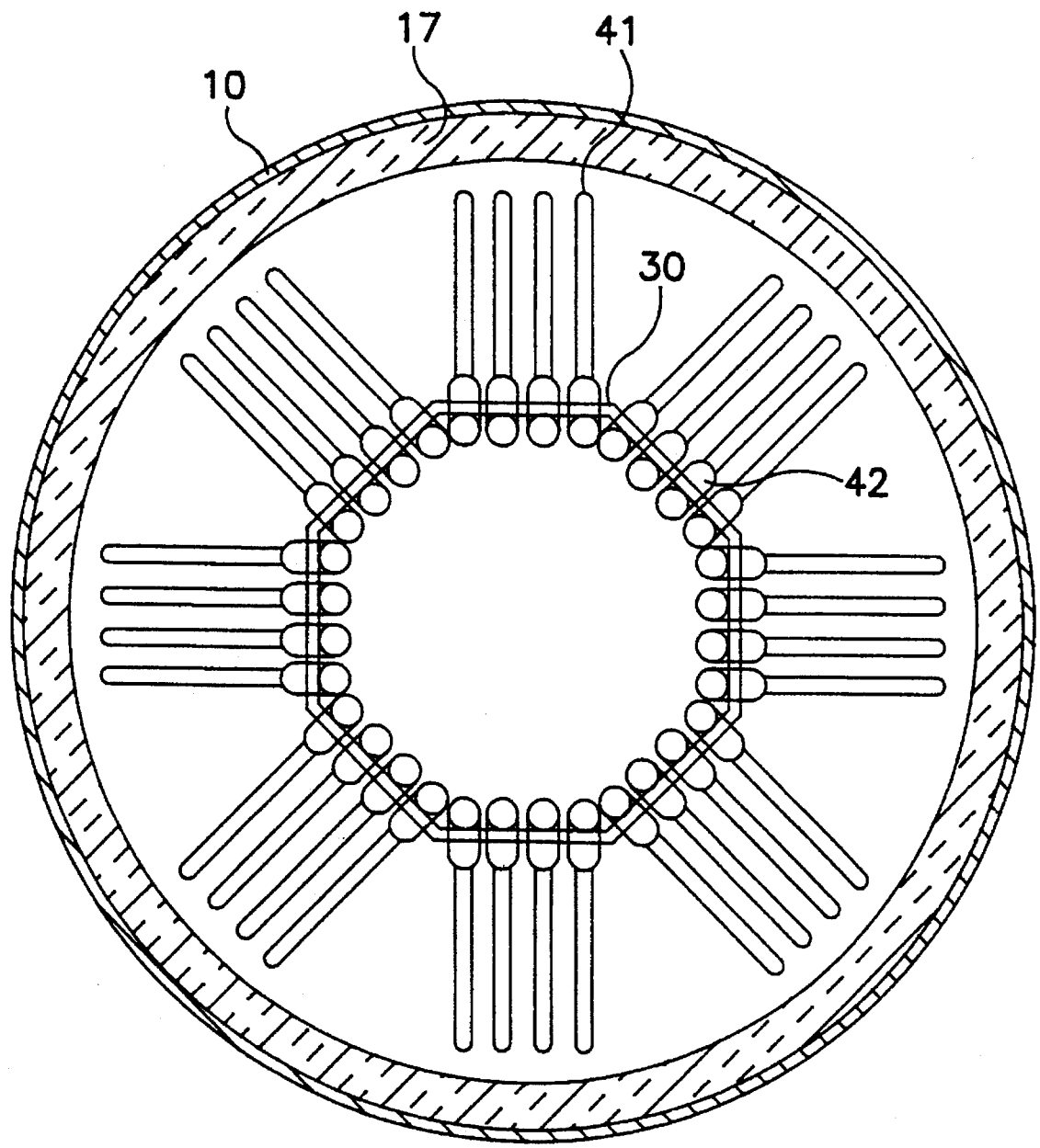
FIG. 4A is a transverse cross-sectional view of another embodiment of the present invention having an octagonal tube sheet.

The tube sheet is not restricted to being cylindrical and can be elliptical or polygonal in cross section, for example. FIG. 4A shows a modification of the embodiment of FIG. 1 in which a tube sheet 30 has an octagonal cross section with eight vertical sides arranged about the longitudinal axis of the vessel 10. Each side supports a plurality of inclined filter assemblies 40 in substantially the same way as the cylindrical tube sheet 20 described above with reference to FIGS. 1 to 3. An octagonal end wall is fixed to the side walls at the bottom of the tube sheet 30, enclosing the bottom of the chamber defined by the tube sheet 30.

For economy of manufacture, the tube sheet 20 is preferably tubular, i.e., an elongated hollow member with a uniform cross-sectional shape over a substantial portion of its height. However, a tube sheet which varies in cross-sectional shape is also possible, such as a conical or pyramid-shaped tube sheet.

In the embodiment of FIG. 1, the filter elements 41 are arranged in tiers (FIG. 3A illustrates a single tier), and the angle of slope $\alpha$ is the same for all the filter elements 41 in a single tier so that the filter elements 41 in the tier define a conical shape. However, it is possible for the angle of slope $\alpha$ to vary among the filter elements 41 within a tier. Furthermore, in the illustrated embodiment, the angle of slope $\alpha$ is the same for each tier over the height of the tube sheet 20 so that filter elements 41 in different tiers are parallel to one another, but this need not be the case, and the angle of slope $\alpha$ may vary over the height of the tube sheet 20. The filter elements 41 in each tier are evenly spaced around the entire periphery of the tube sheet 20, but the spacing between the filter elements 41 can be variable, and they need not be installed around the entire periphery. The filter elements 41 in adjoining tiers may be installed directly above one another, or they may be staggered from one another in the circumferential direction of the tube sheet 20.

In FIG. 1, all of the filter elements 41 are shown extending nonvertically from the tube sheet 20. However, it is possible for some of the filter elements 41 to extend vertically, such as the filter elements 41 mounted on the lower end of the tube sheet 20 in order to more effectively utilize the space beneath the tube sheet 20.

The filter elements 41 are illustrated as all having the same length, but the lengths may vary depending on where the filter elements 41 are disposed on the tube sheet 20.

Figure 4B:
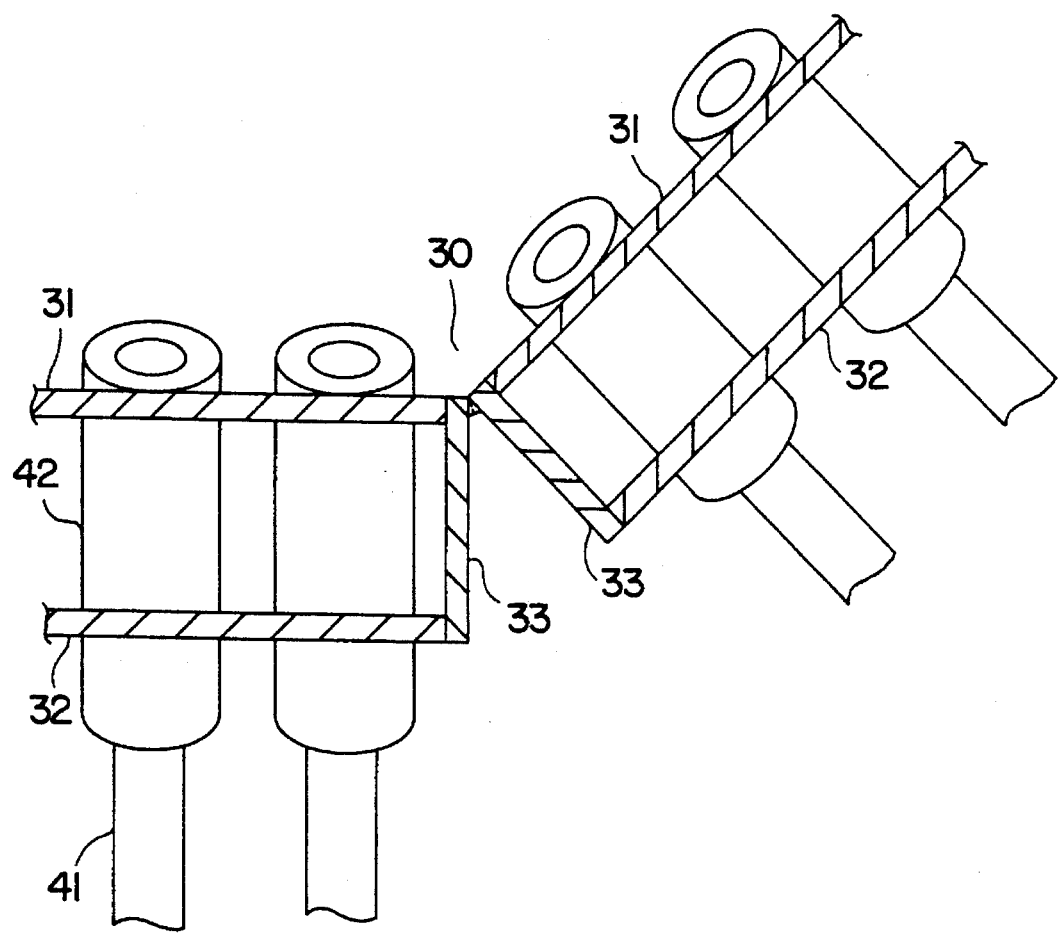
FIG. 4B is an enlarged view of a portion of FIG. 4A.
Figure 5A:
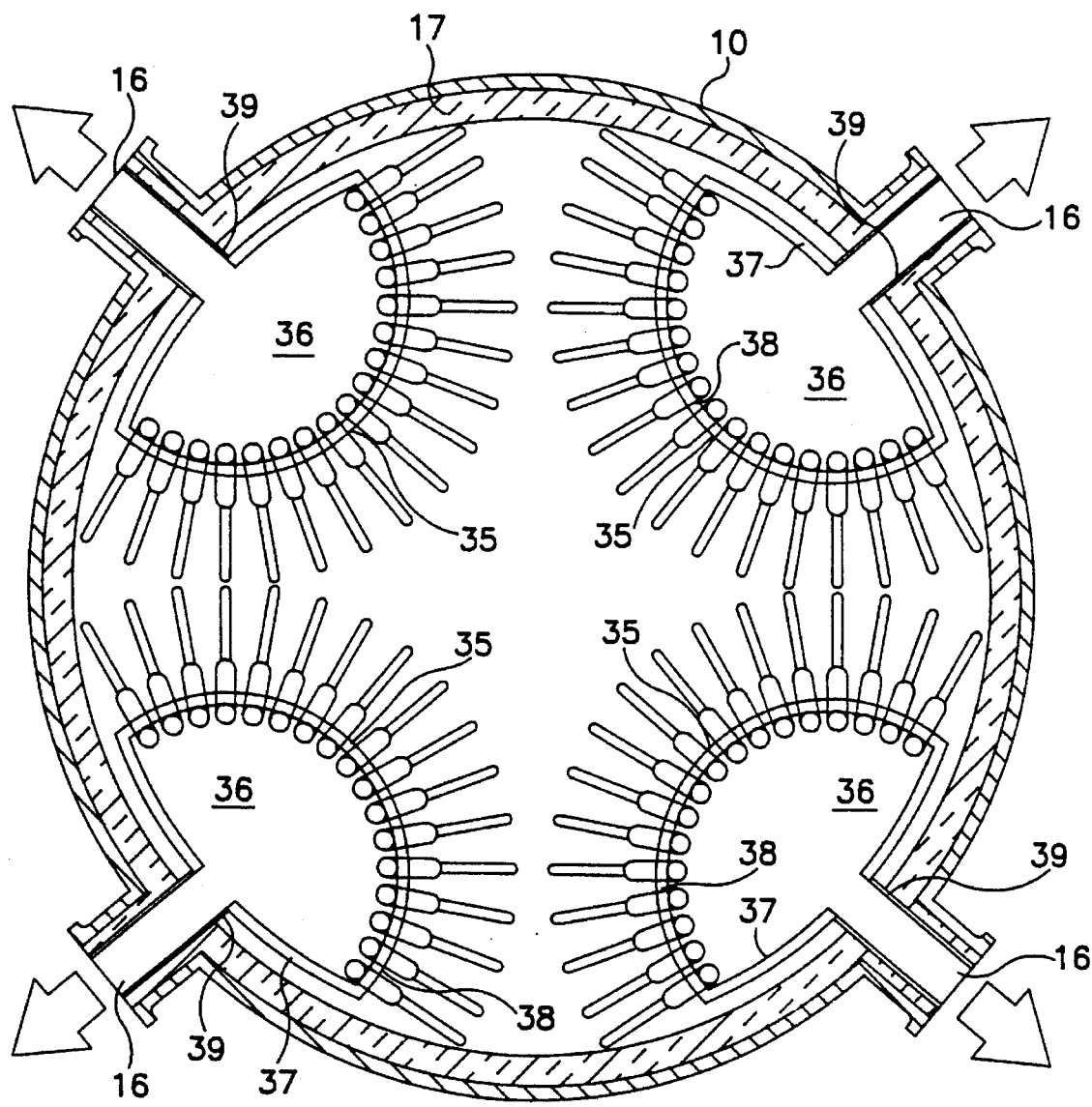
FIGS. 5A and 5B are transverse cross-sectional views of embodiments of the present invention having a plurality of tube sheets.

A filtering apparatus according to the present invention may include more than one tube sheet. FIG. 5A illustrates an embodiment of the present invention in which a vessel 10 contains four separate tube sheets 35, each defining a separate chamber 36 having a periphery surrounded by the tube sheet 35. Each tube sheet 35 has an arcuate rear wall 37 parallel to and adjacent the curved interior surface of the vessel 10 and an oppositely curved front wall 38 extending between the widthwise ends of the rear wall 37 and projecting towards the center of the vessel 10. Each front wall 38 supports a plurality of filter assemblies 40 arranged in tiers and having filter elements 41 at an angle $\alpha$ to the vertical as described above with reference to FIGS. 1 to 4. The filter elements 41 may be supported by support members, such as those illustrated in FIGS. 2A and 2B.

Each tube sheet 35 includes an outlet 39 extending from the rear wall 37 of the tube sheet 35 through an associated outlet 16 in the vessel 10 for passage of filtered gas from the interior of the associated chamber 36 to the exterior of the vessel 10.

The lower end of each tube sheet 35 is closed off, and the upper end of each tube sheet 35 communicates with an associated service opening provided in the upper portion of the vessel 10 so that a service worker can enter the tube sheet 35 to install and replace the filter elements 41. A lid 14 and a heat shield 19 of the kind described above with reference to FIG. 1 may be provided for each tube sheet 35. The dimensions of each tube sheet 35 are preferably sufficiently large that each filter element 41 can be entirely withdrawn into the tube sheet 35 in the lengthwise direction of the filter element 41.

In use, the filter elements 41 operate to remove particles from hot gases in the same manner as in the embodiment of FIG. 1. The use of a plurality of tube sheets has the advantage, however, that the filter elements 41 of each tube sheet can be cleaned as a group by blowback, for example, while the filter elements 41 of the other tube sheets continue to filter hot gas.

Figure 5B:
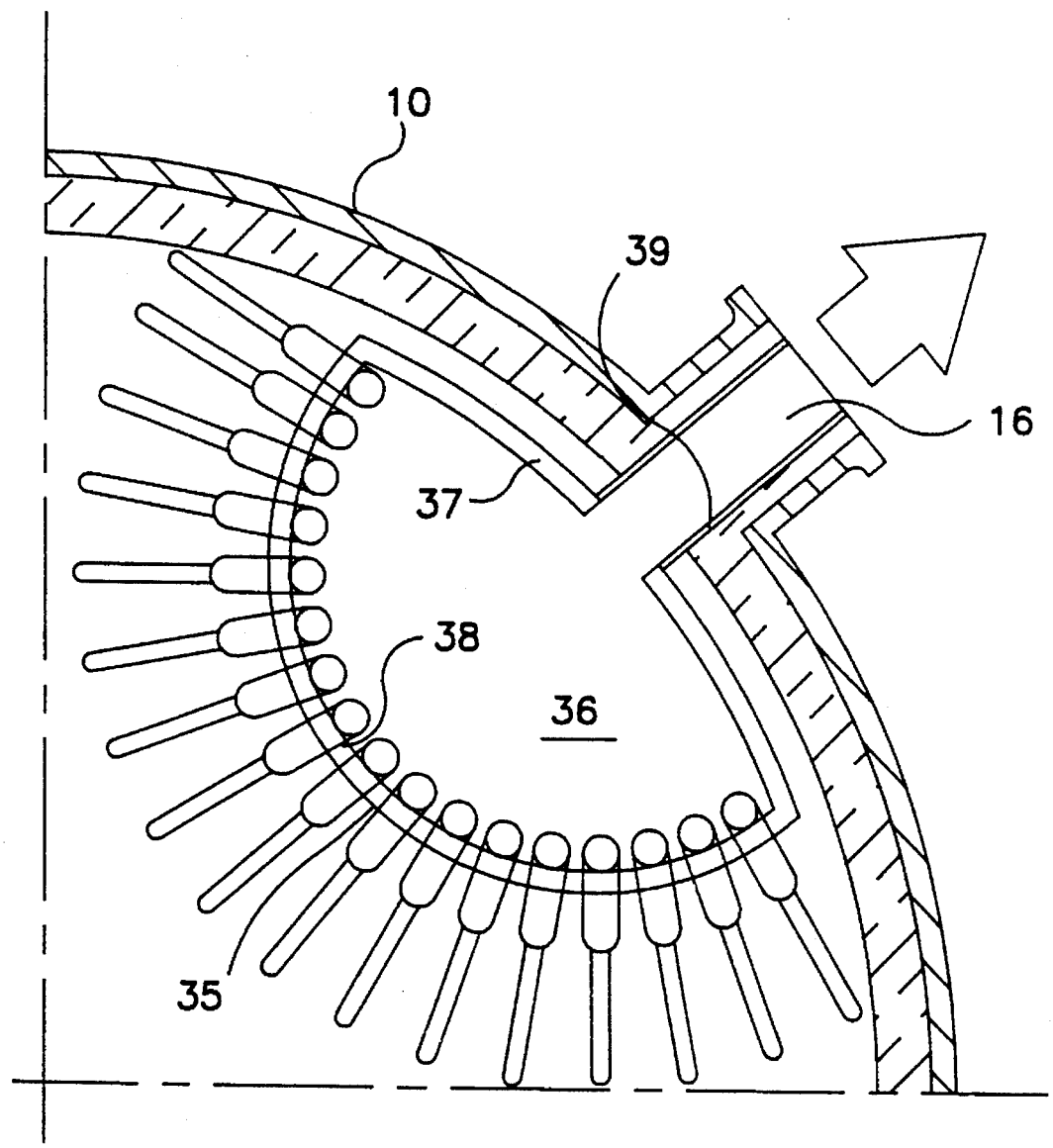

If all of the filter elements 41 in each tier are of the same length, as in the embodiment of FIG. 5A, there may be significant empty space near the axial center of the vessel 10 which could be employed to house the filter elements 41. FIG. 5B illustrates one tube sheet 35 of an embodiment in which the length of the filter elements 41 in each tier increases towards the widthwise center of the tier, i.e., towards the widthwise center of the front wall 38 so that the outer ends of the filter elements 41 near the widthwise center of the tier extend closer to the axial center of the vessel 10 and reduce the amount of unused space within the vessel 10. The other three unillustrated tube sheets 35 of this embodiment are similarly constructed with filter elements 41 of varying lengths. The structure of this embodiment is otherwise identical to the embodiment of FIG. 5A.

There are no limits on the number of tube sheets which can be installed in a single vessel 10. Furthermore, when there are a plurality of tube sheets, they need not have the shapes illustrated in FIGS. 5A and 5B, and may have filter assemblies mounted around their entire periphery instead of only on a front wall thereof.

In each of the preceding embodiments, the tube sheet is spaced from the inner surfaces of the vessel 10 and defines a chamber having a periphery surrounded by the walls of the tube sheet. While it is possible to attach the tube sheet to the inner surface of the vessel 10 so that the vessel 10 forms one of the sides of the chamber, it is preferable that the chamber be separated from the inner surface of the vessel 10 by the tube sheet so that the insulating material 17 is disposed outside of the chamber and cannot contaminate the downstream side of the tube sheet.

One example of an application of a filtering apparatus according to the present invention is for filtering hot gases in a power generation system where hot gases from pressurized fluidized bed combustion are passed to a gas turbine for power generation. The hot gases generated by such a bed are laden with particulate matter such as dust and ash. The gases are initially passed through a cyclone which removes the larger particles but, in general, the hot gas leaving the cyclone will be laden with fly ash. The filtering apparatus of the present invention can then be used to remove such fly ash.

The particle laden hot gas is fed into the vessel 10 through the inlet 15. There is a pressure differential between the vessel 10 and the interior of the tube sheet 20, so the hot gases are drawn into the tube sheet 20 through the filter elements 41, which act to remove the fly ash. The gases then exit through the outlet 16 to the gas turbine. The heat shield 19 shields the flange 13 and the lid 14 from the high temperature gases within the tube sheet 20.

The pressure drop across the filter elements 41 increases with time due to the accumulation of particulate matter within and on the exterior of the filter elements 41. It is the increase in pressure drop caused by such accumulation that determines the efficient functioning of the apparatus rather than the filtration efficiency, since the retention efficiency of ceramic filter elements, commonly used in hot gas filtration, is close to 100%.

For this reason, when the pressure drop across the filter elements 41 reaches a certain level, it is desirable to either replace or clean the filter elements 41 and thereby reduce the pressure drop to a suitable level. The filter elements 41 can be cleaned by producing reverse fluid flow through the filter elements 41 in the opposite direction from the normal flow direction during filtering, i.e., from the inside of the tube sheet 20 towards the outside. Such a reverse flow can be produced in a variety of ways, such as by introducing a fluid for cleaning into the tube sheet 20 through the outlet 16 of the vessel 10 and having the cleaning fluid flow through all the filter elements 41 simultaneously.

However, when the filter elements 41 are used for filtering gases, it is generally preferred to clean the filter elements 41 by blowback in which a gas is directed into the downstream end of each filter element 41 individually. As discussed above, if separate piping for a blowback gas is provided for each filter element 41, the length and cost of the piping for a filtering apparatus having a large number of filter elements 41 can be extremely large.

Figure 6:
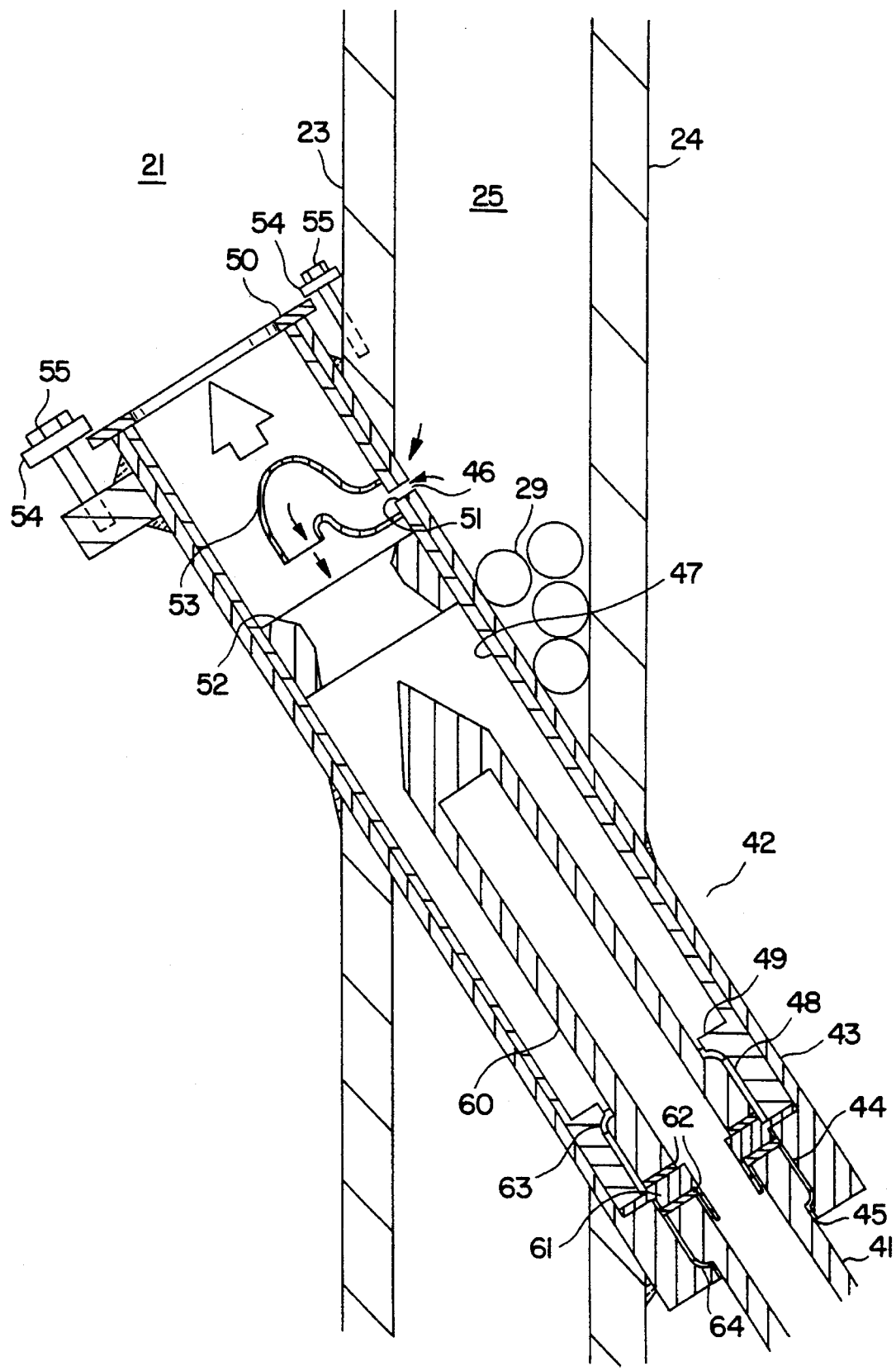
FIG. 6 is an enlarged vertical cross-sectional view of the downstream end of one of the filter assemblies of the embodiment of FIG. 1.

Therefore, according to one aspect of the present invention, a reverse flow cleaning fluid, such as a blowback gas, is preferably supplied to individual filter elements 41 through one or more passages defined by the walls of the tube sheet 20. As best shown in FIG. 6, which is an enlarged view of the downstream end of one of the filter assemblies 40 of the embodiment of FIG. 1, the tube sheet 20 in this embodiment has a double-walled construction with an inner wall 23 and an outer wall 24 separated from the inner wall 24 by a space 25 which serves as a passage for cleaning fluid. As shown in FIG. 1, cleaning fluid can be introduced into the space 25 from outside the vessel 10 through a cleaning fluid inlet 26 passing through an upper portion of the vessel 10, such as the lid 14. The inlet 26 is connected with the tube sheet 20 by a connecting pipe 27 having an upper end connected to the cleaning fluid inlet 26 and a lower end connected to the inner wall 23 of the tube sheet 20. If the cleaning fluid inlet 26 passes through the lid 14, the cleaning fluid inlet 26 and the connecting pipe 27 are preferably slidably connected to each other so that the cleaning fluid inlet 26 can be readily detached from the connecting pipe 27 when the lid 14 is removed. A slip seal can be disposed between members 26 and 27 to prevent leakage of the cleaning fluid. The cleaning fluid inlet 26 can be connected to a source of a suitable cleaning fluid, which can be selected based on the characteristics of the filter elements 41. When the filter elements 41 are ceramic filter elements for hot gases, examples of a suitable cleaning fluid are preheated nitrogen or air introduced into the cleaning fluid inlet 26 from a pressurized reservoir.

In FIG. 6, the filter element 41 is supported by a mount 42 which enables the filter element 41 to be mounted on and dismounted from the tube sheet 20 from within the chamber 21 inside the tube sheet 20 without disassembling the tube sheet 20. The mount 42 includes a cylindrical outer tube 43 and a cylindrical inner tube 47 slidably received within the outer tube 43. The outer tube 43 passes through the inner and outer walls 23 and 24 and is connected to both walls in a fluid tight manner, such as by welding. The inner end or downstream end of the filter element 41 has an enlarged portion, and the lower end of the outer tube 43 has a bore 44 shaped to receive the enlarged end. The filter element 41 passes through a hole 45 in the outer tube 43 having a diameter smaller than the outer diameter of the enlarged portion of the filter element 41 so that the filter element 41 will not fall out of the outer tube 43. A hollow fuse 60 for protecting the filtering apparatus in event of breakage of the filter element 41 may be installed on the downstream end of the filter element 41. The fuse 60 is constructed of a coarse grade of filter medium, such as a sintered porous metal medium and presents a relatively small filtration surface. When the filter element 41 is functioning normally, only clean fluid which has already passed through the filter element 41 flows through the coarse fuse 60, so it produces only an insignificant pressure drop. If the filter element 41 should break or crack and allow unfiltered fluid to pass through it, due to the small filtration surface of the fuse 60, a particulate matter in the unfiltered fluid will quickly plug up the fuse 60 and effectively prevent fluid from passing through the fuse 60. While the fuse 60 is optional, it is frequently desirable in fluid systems in which it is important to prevent contaminants from reaching the downstream side of the tube sheet 20 under all conditions.

The filter element 41 and the fuse 60 are held in place between the lower end of the outer tube 43 the lower end of the inner tube 47, which has a bore 48 corresponding to the shape of the lower end of the fuse 60 and a ledge 49 opposing a shoulder formed on the lower end of the fuse 60.

A metal spacer 61 and seal members 62 are sandwiched between the lower end of the fuse 60 and the inner end of the filter element 41. When the inner tube 47 is pressed into the outer tube 43, the seal members 62 are compressed between the fuse 60, the filter element 41, and the spacer 61 form a fluid tight seal. Furthermore, seal members 63 and 64 may be installed between the bore 44 of the outer tube 43 and the enlarged portion of the filter element 41, and between the bore 48 of the inner tube 47 and the shoulder of the fuse 60 to create fluid tight seals in these regions. The seal members 62–64 can be selected in accordance with the type of filter elements and the filtering conditions. When the filter element 41 is used to filter hot gases, an example of a suitable material for the seal members is a high temperature gasket material available from 3M Corporation under the trade designation Interam.

The upper ends of the inner and outer tubes 43 and 47 are open so that fluid filtered by the filter element 41 can flow into the chamber 21 defined by the tube sheet 20. An annular flange 50 is secured to the upper end of the inner tube 47. The inner tube 47 can be retained inside the outer tube 43 by suitable hold-down members, such as one or more washers 54 disposed held against the flange 50 by bolts 55 which screw into a flange formed on the outer tube 43 or into the inner wall 23 of the tube sheet 20.

A nozzle 52, such as a venturi or one which diverges towards the downstream end of the filter element 41, is mounted inside the inner tube 47 between the fuse 60 and the inner end of the inner tube 47. Holes 46 and 51 for cleaning fluid are formed in the walls of the outer tube 43 and the inner tube 47, respectively, between the space 25 between the walls of the tube sheet 20 and the inside of the inner tube 47. A curved pipe 53 for directing cleaning fluid into the nozzle 52 is mounted on the inside of the inner tube 47 with one end communicating with the hole 51 in the wall of the inner tube 47 and the other end opposing the narrow end of the nozzle 52.

During filtering operation, process fluid which has been filtered by the filter element 41 flows through the fuse 60, the nozzle 52, and then into the chamber 21 defined by the tube sheet 20 through the inner end of the inner tube 47 as shown by the hollow arrow. Backpressure within the space 25 prevents any significant amount of process fluid from flowing through the pipe 53 and into the space 25 between the walls of the tube sheet 20. When the filter element 41 is to be cleaned by blowback, the flow of process fluid is typically interrupted and the blowback fluid is introduced into the space 25 between the walls of the tube sheet 20 from outside the vessel 10. As shown by the solid arrows, the blowback fluid flows through the holes 46 and 51 in the outer and inner tubes 43 and 47, through the pipe 53, through the nozzle 52, and then in the reverse flow direction through the fuse 60 and the filter element 41. Contaminants accumulated on the exterior of the filter element 41 are dislodged by the reverse flow and fall from the filter elements 41 to the bottom of the vessel 10, from which they can be removed via the particulate outlet 11. The slope of the filter elements 41 with respect to the vertical makes it easier for the contaminants to slide down the filter elements 41 and so increases the efficiency of blowback cleaning.

To replace rather than clean the filter element 41, the hold down bolts 55 and washers 54 may be removed from inside the chamber 21. The inner tube 47 along with the fuse 60 and spent filter element 41 may then be pulled up into the chamber through the outer tube 43. A new filter element 41 and fuse 60 can be inserted into the outer tube 43 from the inner end thereof, and the inner tube 47 can then be inserted into the outer tube 43 to clamp the fuse 60 and the filter element 41 in place. The bolts 55 and washer 54 can then be reinstalled to hold the-inner-tube 47 in position.

When the embodiment of FIG. 6 is used for filtering hot gas, if cleaning by blowback is carried out soon after filtering has been performed, the walls 23 and 24 of the tube sheet 20 will retain heat from the filtering operation and will warm the blowback fluid passing through the space 25 before the blowback fluid contacts the filter elements 41. This warming of the blowback fluid is advantageous because it reduces the possibility of damage to the filter elements 41 by thermal shock, particularly when the filter elements 41 are ceramic candles. Moreover, the space 25 between the walls of the tube sheet 20 provides a large cross-sectional flow area for the blowback fluid, so pressure losses in the blowback fluid flow path are minimized.

In order to enhance the ability of the tube sheet 20 to warm the blowback fluid, the space 25 may contain objects 29 having good heat retaining properties, such as balls, plates, or a corrugated structure made of a ceramic or a high-temperature metal, as shown in FIG. 6. These heat retaining objects 29 can absorb heat through the walls 23 and 24 of the tube sheet 20 during filtering, and then transfer the retained heat to blowback fluid passing through the space 25 during blowback cleaning. The number and size of the heat retaining objects 29 can be selected in accordance with the desired flow rate through the space 25 and the desired rate of heat transfer.

The double-walled construction of the tube sheet 20 is also advantageous in that the tube sheet can be far lighter than a solid tube sheet of the same stiffness because of the high bending modulus obtain by spacing the walls 23 and 24 from one another. A double-walled tube sheet is therefore far more economical than a solid tube sheet, particularly when the tube sheet is made of an expensive high-temperature metal. For example, for a filter vessel with a diameter of 12 feet, a conventional solid tube sheet might need to be 5 or 6 inches thick, whereas the inner and outer walls of a double-walled tube sheet according to the present invention can each be less than an inch thick. Since the walls 23 and 24 of the tube sheet 20 are much thinner than a solid tube sheet, it is easier to form holes in the walls for receiving the mount 42 of a filter assembly 40, thus decreasing manufacturing costs. These advantages can be obtained whether or not the space 25 between the walls of the tube sheet 20 is used to transport a cleaning fluid.

For the same reasons, given the same amount of material, a double-walled tube sheet according to the present invention can be far stronger than a solid tube sheet. This advantage is especially important at high operating temperatures, at which the strength of the material forming the tube sheet generally decreases.

The space 25 between the walls 23 and 24 of the tube sheet 20 may be a continuous annulus as viewed from above, so that all of the filter elements 41 are supplied with cleaning fluid simultaneously. Alternatively, as shown in FIG. 3B, which is an enlarged view of a portion of the tube sheet 20 of FIG. 3A, the space 25 can be divided into a plurality of fluidly isolated sections by vertical partitions 28 sealingly connected between the walls 23 and 24 of the tube sheet 20. By separately introducing cleaning fluid into the different sections, the filter elements 41 of one section can be cleaned independently of the filter elements 41 of a different section. Different blowback inlets and/or a valving arrangement may be connected to the different sections to appropriately introduce the cleaning fluid.

The tube sheet 30 of the embodiment of FIG. 4A and the tube sheets 35 of the embodiment of FIGS. 5A and 5B likewise preferably have a double-wall construction so that a cleaning fluid can be introduced to the filter elements 41 through the walls of the tube sheets.

In the embodiment of FIG. 4A, the inner spaces of the eight sides of the octagonal tube sheet 30 may be either fluidly connected to each other, or they can be fluidly isolated from one another so that the filter elements 41 mounted on each wall can be cleaned independently of each other. FIG. 4B is an enlarged view of a portion of the embodiment of FIG. 4A showing a possible structure of the tube sheet 30. Each side of the tube sheet 30 has an inner wall 31, an outer wall 32 separated from the inner wall 31 by a space, and side walls 33 connecting the inner and outer walls 31 and 32. The side walls 33 of adjoining sides of the tube sheet 30 are rigidly secured to one another by welding, for example, but fluidly isolate the internal spaces of adjoining sides to permit independent cleaning of the filter elements 41 on each side. However, by eliminating the side walls 33 and extending the outer walls 32 of adjoining sides so that they meet one another, all the sides of the tube sheet 30 can be made to fluid communicate with each other.

The structure illustrated in FIG. 6 is just one example of how a filter element 41 may be connected to a tube sheet of a filtering apparatus according to the present invention, and many other methods can be employed, depending upon the material of which the filter element is formed. For example, if the filter element is formed from a porous sintered metal, it can be welded directly to a metal tube sheet without the need for a mount to support the filter element. Thus, any suitable connecting method known in the art can be employed to install filter elements on a tube sheet.

FIGS. 7–10 illustrate embodiments exemplifying other possible ways of connecting a filter assembly to a double-walled tube sheet of a filtering apparatus according to the present invention. In these embodiments, the tube sheet 80 is substantially planar instead of tubular and has an inner wall 81 and an outer wall 82 extending across the interior of an unillustrated filter vessel to separate the inlet and the outlet of the vessel. The unillustrated outer peripheral edges of the walls 81 and 82 are connected together by a spacer. The filter elements 41 extend perpendicularly from the tube sheet 80. However, these arrangements are equally applicable to a tubular tube sheet, such as the tube sheet 20 of the embodiment of FIG. 1, and can be employed regardless of the angle of the filter elements 41 with respect to the tube sheet 80 or the vertical, and regardless of the angle of the tube sheet 80 with respect to the vertical.

Figure 7:
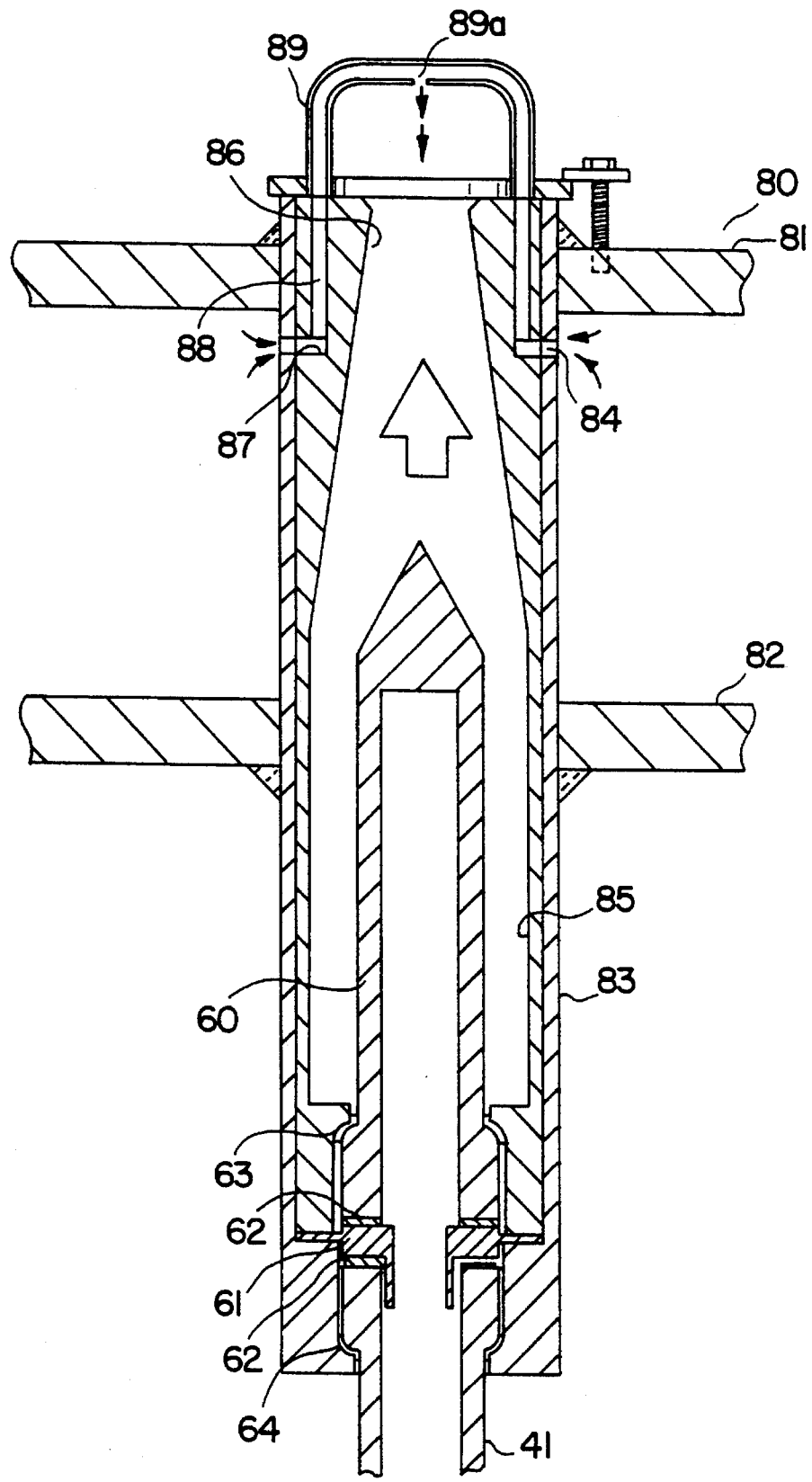
FIGS. 7 through 9, 10A, and 10B are cross-sectional views of other embodiments of the present invention.

The embodiment of FIG. 7 includes a mount having a cylindrical outer tube 83 and a cylindrical inner tube 85 which clamp a filter element 41 and a fuse 60 therebetween in the same manner as in the embodiment of FIG. 6. The inner tube 85 has a nozzle 86 integrally formed on its inner surface. One or more through holes 84 for cleaning fluid are formed through the wall of the outer tube 83, and these communicate with an annular groove 87 formed in the outer periphery of the inner tube 85. Two connecting holes 88 are formed in the inner tube 85 between its upper surface and the annular groove 87, and a tube 89 having an orifice 89a opposing the upper end of the nozzle 86 is connected between the upper ends of the holes 88. The structure of this embodiment is otherwise similar to that of the embodiment of FIG. 6. Other unillustrated filter elements 41 are mounted on the tube sheet 80 in a similar manner.

The outer tubes 83 of the mounts serve not merely to attach the filter elements 41 to the tube sheet 80 but also function as structural supports for the walls 81 and 82 of the tube sheet 80. The result is a strong, lightweight structure.

During normal filtration, filtered fluid flows from the filter element 41 to the downstream side of the tube sheet 80 (the upper side in FIG. 7) as shown by the hollow arrow. When reverse flow cleaning is to be performed, cleaning fluid introduced into the space between the walls 81 and 82 of the tube sheet 80 flows into the through holes 84, the annular groove 87, the connecting holes 88, and the tube 89 and is jetted from the orifice 89a in the tube 89 towards the filter element 41, thus cleaning the filter element 41 in the same manner described with respect to the embodiment of FIG. 6. The filter element 41 can be installed and replaced from the downstream side of the tube sheet 80 (the upper side in FIG. 7) in the same manner as described with respect to the embodiment of FIG. 6.

Figure 8:
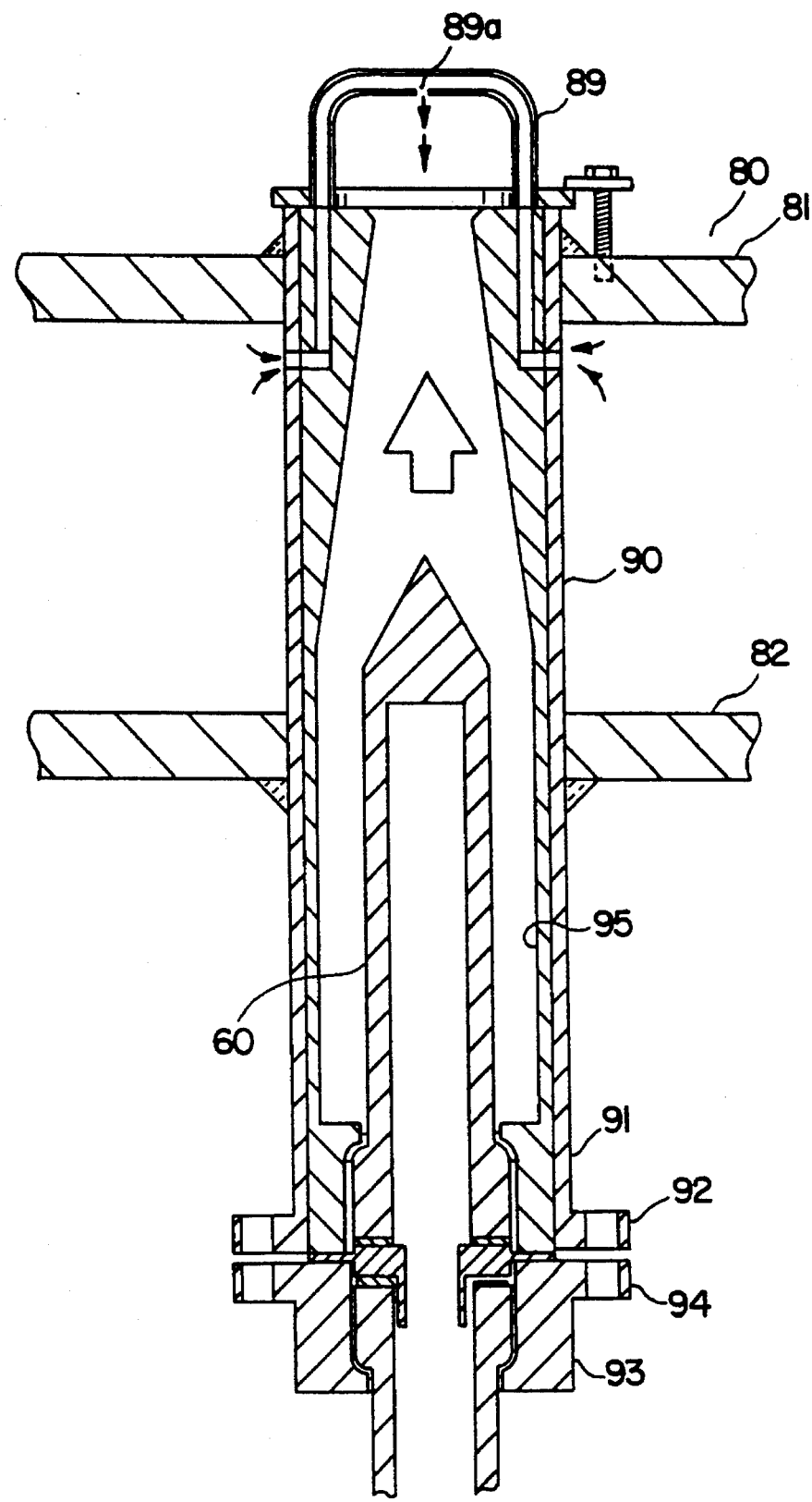

In some cases, it may be desirable to replace the filter element 41 from the upstream side of the tube sheet 80 instead of from the downstream side. This also applies to the embodiments having a tubular tube sheet. FIG. 8 illustrates an embodiment which is similar to the embodiment of FIG. 7 except that each filter element 41 is supported by the tube sheet 80 so that it can be detached from the upstream side of the tube sheet 80. This embodiment includes an outer tube 90 and an inner tube 95. The outer tube 90 has the same overall shape as the outer tube 83 of FIG. 7 except that it is divided into an upper section 91 which is secured to the tube sheet 80 and a lower section 93 which supports the downstream end of the filter element 41. The two sections 91 and 93 can be detachably secured to each other by any suitable means, such as by bolts passing through opposing flanges 92 and 94 formed on the two sections. The inner tube 95 is identical to the inner tube 83 of FIG. 7, and the filtering and cleaning operations of this embodiment are essentially the same as for the embodiment of FIG. 7.

Figure 9:
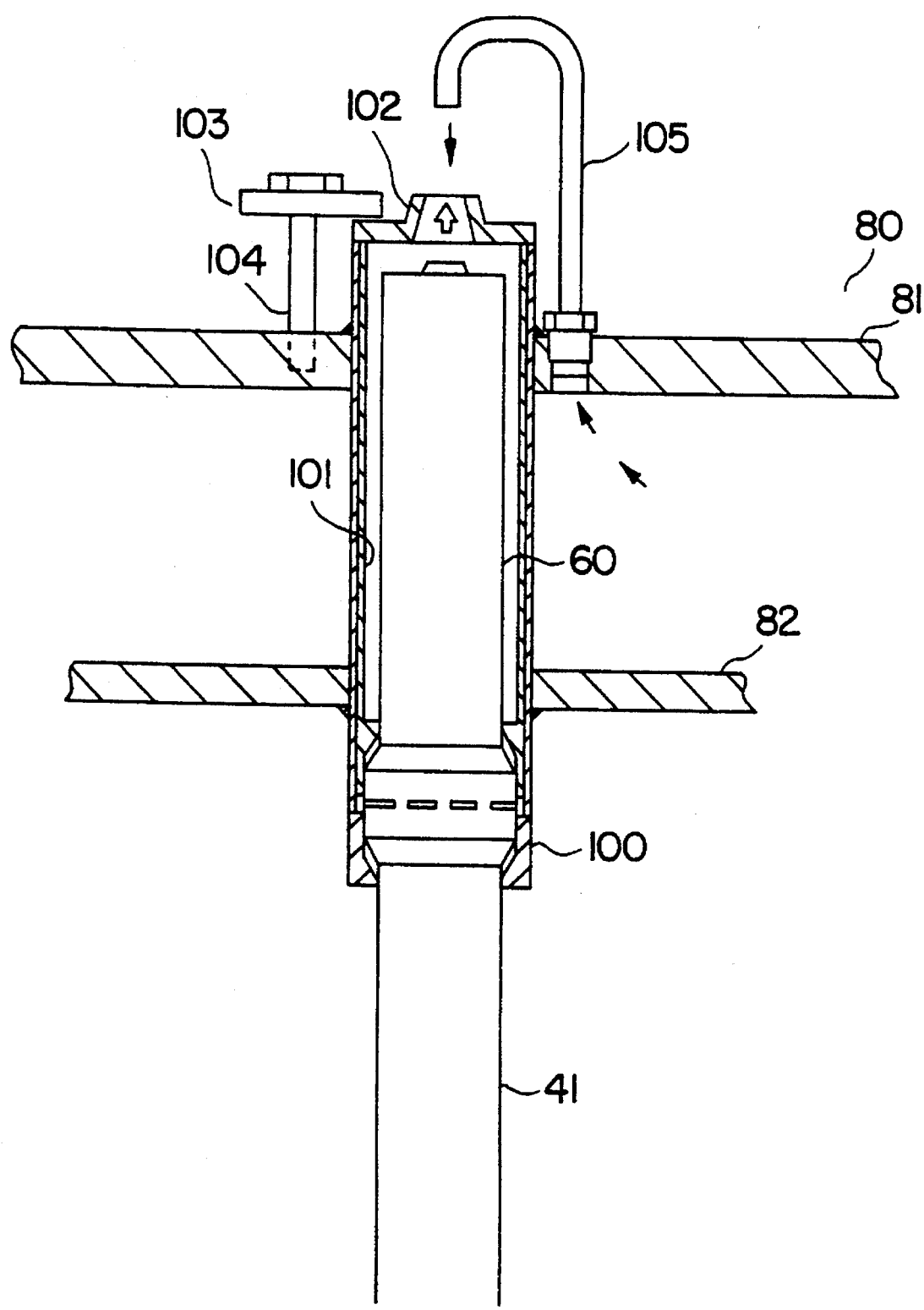

In the embodiment of FIG. 9, each filter element 41 is supported by a mount having a cylindrical outer tube 100 sealingly connected to the walls of the tube sheet 80 and a cylindrical inner tube 101 slidably disposed within the outer tube 100. The filter element 41 and a fuse 60 are clamped between the tubes 100 and 101 in the same manner as in the embodiment of FIG. 6. A nozzle 102 is secured to the open upper end of the inner tube 101. The inner tube 101 is held in place inside the outer tube 100 by suitable hold-down members, such as one or more washers 103 pressed against the upper surface of the nozzle 102 by bolts 104 which screw into the inner wall 81 of the tube sheet 80. Cleaning fluid can be introduced into the nozzle 102 by a pipe 105 mounted on the inner wall 81 of the tube sheet 80 and having a first end communicating with the space between the walls of the tube sheet 80 and a second end opposing the nozzle 102. The hollow arrow in the figure illustrates the direction of fluid flow during normal filtration, and the solid arrows illustrate the direction of flow of cleaning fluid during cleaning.

Figure 10A:
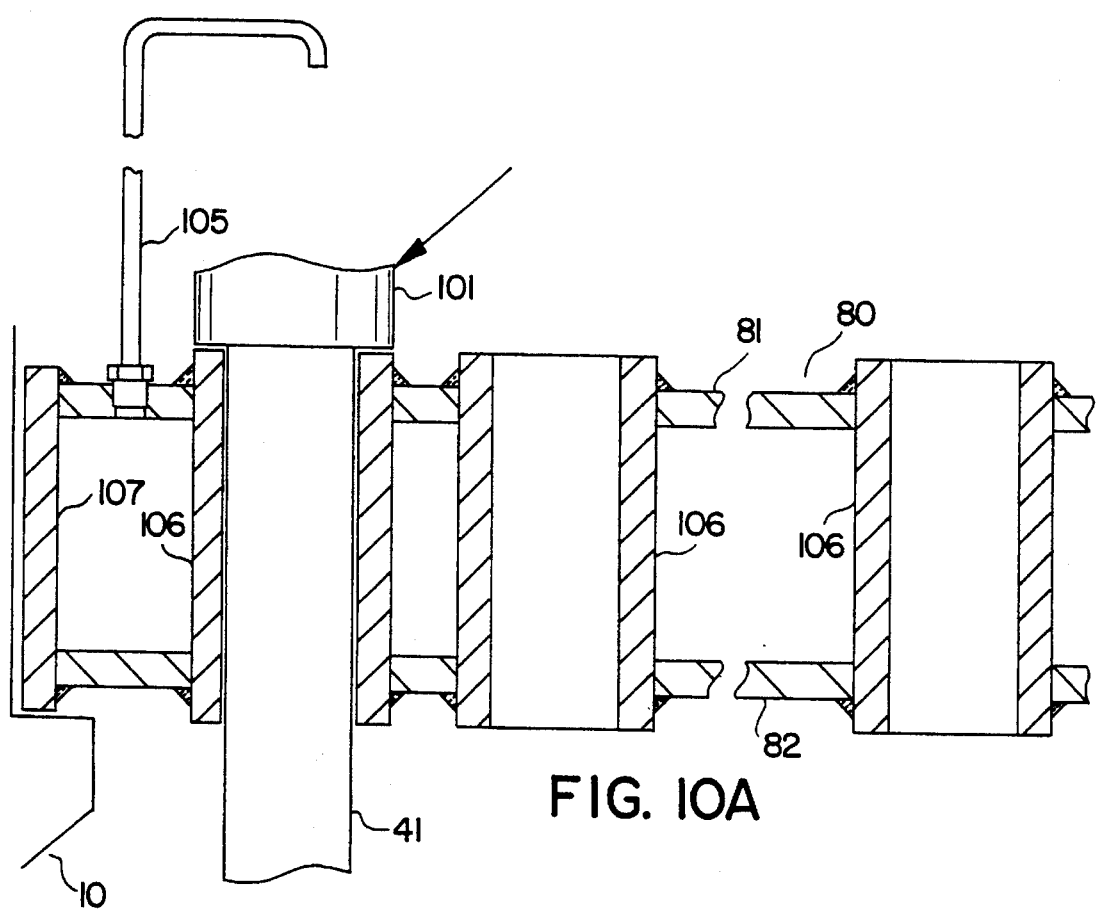
Figure 10B:
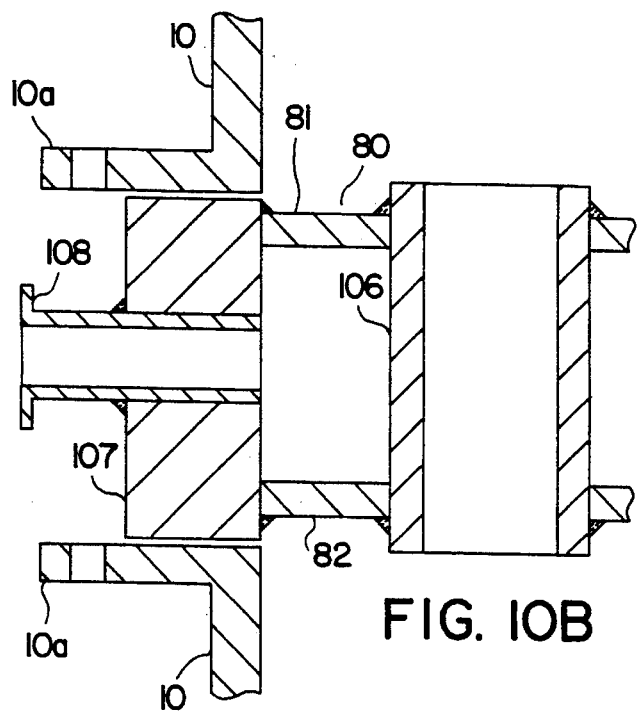

In the embodiments of FIGS. 10A and 10B, the tube sheet 80 is disc-shaped and has planar inner and outer walls 81 and 82 of the rigidly connected together by a plurality of rigid tubes 106 which are sealed to the walls 81 and 82 in a fluid-tight manner, such as by welding. The tubes 106 may be of any cross-sectional shape, such as cylindrical or polygonal. A spacer 107 is sealingly connected between the walls 81 and 82 along their outer periphery. The entire tube sheet 80 is sealingly connected to the filter vessel 10 in any suitable manner to separate the inlet from the outlet of the vessel 10. For example, the spacer 107 can be sealingly connected to a ledge on the interior of the filter vessel 10. Alternatively, as shown in FIG. 10B, if the vessel 10 is equipped with a body flange connecting upper and lower halves of the vessel 10, the spacer 107 can be sandwiched between the two halves 10a of the body flange in a fluid tight manner. A plurality of filter assemblies are installed the tubes 106 and attached in any suitable manner which will create a fluid-tight seal. For example, a filter assembly mount like the one illustrated in FIG. 9 can be disposed atop each tube 106 with the corresponding filter element 41 extending through the tube 106 to the upstream side of the tube sheet 80. Alternatively, if the filter element 41 is made of metal, it can be welded directly to one of the tubes 106. A pipe 105 for cleaning fluid (only one of which is shown) is provided for each filter element 41 to direct cleaning fluid into the downstream end of the mount. The operation of this embodiment is similar to that of the embodiment of FIG. 9.

Cleaning fluid can be introduced into the space between the walls 81 and 82 of the tube sheet 80 by suitable piping, which can pass through the tube sheet 80 in any convenient location. In the arrangement shown in FIG. 10B, in which the spacer 107 of the tube sheet 80 is held between the halves 10a of a body flange, one or more inlet pipes 108 for cleaning fluid can be installed on the spacer 107 itself instead of passing through a wall of the filter vessel 10. This arrangement is quite advantageous, because the spacer 107 can be made thick enough to receive a large-diameter inlet pipe 108.

The dimensions of the various portions of the tube sheet 80 (the thickness of the walls 81 and 82, the wall thickness and lengths of the tubes 106) can be selected, using well-known structural design principles, based on factors such as the weight which must be supported by the tube sheet 80, the spacing between the filter elements 41, and the differential pressure acting across the tube sheet 80 during operation of the filtering apparatus.

It will be appreciated that there are a number of alternatives to the construction described above with reference to the drawings. For example, the inclining of the filter elements 41 away from the vertical can be used in an arrangement that does not have a lid 14 and a heat shield 19. The reverse is true; the lid 14 and the heat shield 19 can be used in arrangements which do not have filter elements 41 angled away from the vertical.

Although the vessel 10 is shown to be cylindrical, it could be of any suitable shape. The vessel 10 and the tube sheet will usually be arranged vertically; but this is not essential. Furthermore, although the tube sheet is shown as being accessible from the top of the vessel 10, this is not necessary; the tube sheet could be accessible from one side of the vessel 10.

The use of a tube sheet with spaced walls for the conduction of a reverse flow cleaning fluid can be used with arrangements which do not have filter elements 41 angled away from the vertical. Furthermore, the angled filter elements 41 could be supplied with cleaning fluid through a conventional arrangement of pipes and nozzles.

What is claimed is:

1. A filtering apparatus comprising:
   a filter vessel having an inlet and an outlet for fluid;
   a tube sheet disposed within the filter vessel and dividing the filter vessel into a first chamber for unfiltered fluid communicating with the inlet and a second chamber for filtered fluid communicating with the outlet, the tube sheet surrounding the second chamber between first and second lengthwise ends of the second chamber; and
   a plurality of elongated filter elements extending nonvertically from the tube sheet, each filter element having a first end and a second end farther from the tube sheet than the first end and being at a different height than the first end.

2. A filtering apparatus according to claim 1 wherein the first end is higher than the second end.

3. A filtering apparatus according to claim 2 wherein each filter element extends at an angle of approximately 10 to approximately 60 degrees from the vertical.

4. A filtering apparatus according to claim 2 wherein each filter element extends at an angle of approximately 20 to approximately 45 degrees from the vertical.

5. A filtering apparatus according to claim 1 wherein the filter elements are supported by the tube sheet in a manner permitting their installation and removal from within the second chamber.

6. A filtering apparatus according to claim 5 wherein each filter element is supported by the tube sheet in a manner permitting the filter element to be withdrawn from the tube sheet into the second chamber without extending outside the second chamber.

7. A filtering apparatus according to claim 5 wherein the tube sheet includes an access opening at one of the lengthwise ends of the second chamber through which the filter elements can be introduced and removed from the second chamber.

8. A filtering apparatus according to claim 1 wherein the filter elements are supported by the tube sheet in a plurality of sloping tiers.

9. A filtering apparatus according to claim 8 wherein the tiers are parallel to one another.

10. A filtering apparatus according to claim 8 wherein adjacent tiers are staggered in a horizontal direction.

11. A filtering apparatus according to claim 1 wherein the filter elements comprise ceramic filter elements.

12. A filtering apparatus according to claim 11 including support members extending from the tube sheet and externally supporting the weight of the filter elements.

13. A filtering apparatus according to claim 1 wherein each filter element is mounted nonperpendicularly on the tube sheet.

14. A filtering apparatus according to claim 1 wherein the tube sheet has a longitudinal axis and the filter elements extend substantially radially with respect to the axis.

15. A filtering apparatus according to claim 1 wherein the filter elements are disposed around substantially the entire periphery of the tube sheet.

16. A filtering apparatus according to claim 1 wherein the tube sheet has a lower end with a nonvertical surface, and at least two of the filter elements are mounted on the nonvertical surface.

17. A filtering apparatus according to claim 1 wherein the tube sheet has a substantially cylindrical outer periphery.

18. A filtering apparatus according to claim 1 wherein the tube sheet has a polygonal outer periphery.

19. A filtering apparatus according to claim 1 wherein the tube sheet is surrounded by and spaced from an interior wall of the filter vessel.

20. A filtering apparatus according to claim 1 including a plurality of support tubes mounted on the tube sheet, each filter element mounted on one of the support tubes and withdrawable from the tube sheet into the second chamber through the support tube.

21. A filtering apparatus according to claim 20 wherein each filter element has a downstream end disposed within one of the support tubes.

22. A filtering apparatus according to claim 20 including a plurality of clamping members each detachably disposed in one of the support tubes and clamping one of the filter elements within the support tube.

23. A filtering apparatus according to claim 22 wherein each clamping member is a hollow tube disposed within one of the support tubes, the filtering apparatus including a nozzle disposed inside each clamping member opposing the downstream end of the filter element supported by the support tube.

24. A filtering apparatus according to claim 22 wherein each clamping member is a hollow tube disposed within one of the support tubes and having an interior wall defining a nozzle opposing the downstream end of the filter element supported by the support tube.

25. A filtering apparatus according to claim 20 including a nozzle disposed within each support tube opposing a downstream end of the filter element supported by the support tube.

26. A filtering apparatus comprising:

a filter vessel having an inlet and an outlet for fluid;

a tube sheet disposed within and formed separately from the filter vessel and separating the inlet from the outlet and having a double-walled structure with first and second opposing walls separated by a space and a spacer extending around a periphery of the tube sheet and sealingly connected between the walls; and a plurality of filter elements supported by the tube sheet.

27. A filtering apparatus according to claim 26 wherein the filter elements are supported by the tube sheet in a manner permitting the filter elements to be installed on and detached from the tube sheet without disassembling the tube sheet.

28. A filtering apparatus according to claim 26 wherein the tube sheet includes a plurality of support tubes extending between the walls, each support tube supporting one of the filter elements and having an interior defining a passage through the tube sheet for filtered fluid.

29. A filtering apparatus according to claim 28 wherein each support tube is sealingly connected to the walls of the tube sheet.

30. A filtering apparatus according to claim 28 wherein each support tube is welded to the walls of the tube sheet.

31. A filtering apparatus according to claim 28 wherein each support tube extends nonperpendicularly between the walls.

32. A filtering apparatus according to claim 28 wherein each support tube is rigidly connected to both walls.

33. A filtering apparatus according to claim 28 wherein each filter element is supported by one of the support tubes in a manner permitting the filter element to be withdrawn from the tube sheet through the support tube on which the filter element is supported.

34. A filtering apparatus according to claim 26 including a passage for cleaning fluid connected to the space from outside the filter vessel for supplying cleaning fluid to the filter elements through the space.

35. A filtering apparatus according to claim 34 wherein each filter element has a downstream end fluidly connected with the space.

36. A filtering apparatus according to claim 35 including pipes for the cleaning fluid supported by the tube sheet, each pipe having a first end communicating with the space and a second end opposing the downstream end of one of the filter elements.

37. A filtering apparatus according to claim 36 wherein the pipes are mounted on an outer surface of the tube sheet in a region of the filter vessel for fluid filtered by the filter elements.

38. A filtering apparatus according to claim 36 wherein the pipes are disposed between the walls of the tube sheet.

39. A filtering apparatus according to claim 34 comprising a heat retaining members disposed in the space between the walls of the tube sheet for retaining heat transferred through the walls.

40. A filtering apparatus according to claim 34 wherein the passage for cleaning fluid passes through the spacer.

41. A filtering apparatus according to claim 26 wherein the walls of the tube sheet are substantially planar.

42. A filtering apparatus according to claim 26 wherein the filter vessel includes first and second sections and the tube sheet is sandwiched between the first and second sections.

43. A filtering apparatus according to claim 42 wherein the tube sheet is sandwiched between body flanges of the filter vessel.

44. A filtering apparatus according to claim 26 wherein the filter vessel includes a ledge on an interior thereof and the tube sheet is mounted on the ledge.

45. A filtering apparatus comprising:

a filter vessel having an inlet and an outlet for fluid;

a tube sheet dividing an interior of the filter vessel into a first chamber for unfiltered fluid communicating with the inlet and a second chamber for filtered fluid communicating with the outlet of the filter vessel, the tube sheet having inner and outer walls surrounding the second chamber between first and second ends lengthwise ends of the second chamber, the outer wall surrounding the inner wall and being separated from the inner wall by a space; and a plurality of elongated filter elements extending from the outer wall of the tube sheet.

46. A filtering apparatus according to claim 45 wherein the tube sheet is substantially tubular.

47. A filtering apparatus according to claim 46 wherein the tube sheet has a polygonal outer periphery.

48. A filtering apparatus according to claim 46 wherein the tube sheet is substantially cylindrical.

49. A filtering apparatus according to claim 45 including a passage for cleaning fluid connected to the space from outside the filter vessel for supplying cleaning fluid to the filter elements through the space.

50. A filtering apparatus according to claim 49 wherein the space is divided into a plurality of fluidly isolated compartments which can be individually provided with cleaning fluid.

51. A filtering apparatus according to claim 45 wherein the filter elements are disposed around substantially the entire periphery of the tube sheet.

52. A filtering apparatus comprising:

a filter vessel having an inlet and one or more outlets for fluid;

a plurality of tube sheets disposed within the filter vessel, each tube sheet surrounding a different corresponding chamber for filtered fluid having an interior communicating with one of the outlets; and a plurality of filter elements disposed in the filter vessel, each of the tube sheets having a plurality of the filter elements extending nonvertically therefrom, the interior of each chamber being accessible for the removal of filter elements from the corresponding tube sheet into the chamber.

53. A filtering apparatus according to claim 52 wherein each tube sheet has a rear surface opposing an interior surface of the vessel and a front surface opposing a center of the vessel, wherein the length of filter elements supported by the front surface increases towards a widthwise center of the front surface.

54. A filtering apparatus according to claim 53 wherein the rear surface is substantially parallel to the opposing interior surface of the vessel.

55. A filtering apparatus according to claim 52 wherein each tube sheet has a rear surface opposing, spaced from, and substantially parallel to an inner surface of the filter vessel and a front surface opposing a center of the filter vessel, the filter elements being mounted on the front surface.

56. A filtering apparatus according to claim 52 wherein each tube sheet includes an access opening at a lengthwise end thereof for installation and removal of the filter elements.

57. A filtering apparatus comprising:

a filter vessel having an inlet and an outlet for fluid;

a tube sheet disposed within the filter vessel separating the inlet from the outlet and surrounding a chamber for filtered fluid communicating with the outlet, the tube sheet having an upright outer surface; and a plurality of filter elements supported by the upright surface of the tube sheet, the interior of the chamber being accessible for the removal of filter elements from the tube sheet.

58. A filtering apparatus according to claim 57 wherein each filter element is supported by the tube sheet in a manner permitting the filter element to be withdrawn from the tube sheet into the chamber without extending outside the chamber.

59. A filtering apparatus comprising:

a filter vessel having an inlet and an outlet for fluid;

a tube sheet disposed within the filter vessel and separating the inlet from the outlet and having a first tubular wall and a second tubular wall surrounding the first tubular wall and separated from the first tubular wall by a space;

a plurality of filter elements extending from the second wall of the tube sheet; and a passage for cleaning fluid communicating between the space and the outside of the vessel for supplying cleaning fluid to the filter elements through the space.

60. A filtering apparatus according to claim 59 including a passage for cleaning fluid connected to the space from outside the filter vessel for supplying cleaning fluid to the filter elements through the space.

61. A filtering apparatus according to claim 59 wherein the tube sheet includes a plurality of support tubes extending between and secured to the first and second walls, each of the filter elements being mounted on one of the support tubes.

62. A filtering apparatus according to claim 61 wherein the support tubes extend nonperpendicularly between the walls.

63. A filtering apparatus according to claim 61 wherein each of the filter elements is supported by one of the support tubes in a manner permitting the filter element to be withdrawn from the tube sheet into a chamber surrounded by the tube sheet through the support tube on which the filter element is mounted.

64. A filtering apparatus comprising:

a filter vessel having an inlet and an outlet for fluid;

a tube sheet disposed within the filter vessel and dividing the filter vessel into a first chamber for unfiltered fluid communicating with the inlet and a second chamber for filtered fluid communicating with the outlet, the tube sheet comprising first and second opposing walls separated by a space and a plurality of support tubes each rigidly secured to the first and second walls of the tube sheet and communicating between the first and second chambers;

a plurality of filter elements disposed in the first chamber and each supported by one of the support tubes.

65. A filtering apparatus according to claim 64 wherein each of the filter elements is supported by one of the support tubes in a manner permitting the filter element to be withdrawn from the tube sheet into the second chamber through the one of the support tubes.

66. A filtering apparatus comprising:

a filter vessel having an inlet and an outlet for fluid;

a tube sheet disposed within the filter vessel and dividing the filter vessel into a first chamber for unfiltered fluid communicating with the inlet and a second chamber for filtered fluid communicating with the outlet, and a plurality of elongated ceramic candle filter elements mounted on and sloping nonvertically from the tube sheet.

67. A filtering apparatus according to claim 66 wherein each of the filter elements is mounted nonperpendicularly on the tube sheet.

68. A filtering apparatus according to claim 66 wherein the tube sheet surrounds the second chamber, and the filter elements are mounted on the tube sheet around substantially an entire periphery of the tube sheet.

* * * * *